(12) United States Patent
Takahashi et al.

(10) Patent No.: US 7,673,512 B2
(45) Date of Patent: Mar. 9, 2010

(54) ANGULAR VELOCITY SENSOR AND ELECTRONIC DEVICE

(75) Inventors: Kazuo Takahashi, Miyagi (JP); Junichi Honda, Miyagi (JP); Teruo Inaguma, Miyagi (JP)

(73) Assignee: Sony Corporation, Tokyo (JP)

( * ) Notice: Subject to any disclaimer, the term of this patent is extended or adjusted under 35 U.S.C. 154(b) by 60 days.

(21) Appl. No.: 11/928,931

(22) Filed: Oct. 30, 2007

(65) Prior Publication Data
US 2008/0105052 A1  May 8, 2008

(30) Foreign Application Priority Data

| Oct. 30, 2006 | (JP) | .............................. | 2006-293589 |
| Mar. 15, 2007 | (JP) | .............................. | 2007-067638 |
| Mar. 15, 2007 | (JP) | .............................. | 2007-067641 |
| Oct. 25, 2007 | (JP) | .............................. | 2007-278229 |

(51) Int. Cl.
*G01P 9/04* (2006.01)
*H01L 41/08* (2006.01)
(52) U.S. Cl. .................................. 73/504.16; 310/370
(58) Field of Classification Search .............. 73/504.16, 73/504.12, 504.04; 310/370
See application file for complete search history.

(56) References Cited

U.S. PATENT DOCUMENTS

| 5,451,828 | A | * | 9/1995 | Tomikawa et al. | .......... 310/370 |
| 5,912,524 | A | * | 6/1999 | Ohnishi et al. | .............. 310/321 |
| 5,942,839 | A | * | 8/1999 | Ohnishi et al. | .............. 310/359 |
| 5,996,410 | A | * | 12/1999 | Yachi et al. | ............... 73/504.16 |
| 6,288,474 | B1 | * | 9/2001 | Ono et al. | ................... 310/370 |
| 6,298,723 | B1 | * | 10/2001 | Konno et al. | ............. 73/504.16 |
| 6,327,908 | B1 | * | 12/2001 | Yachi et al. | ............... 73/504.16 |
| 6,647,786 | B2 | * | 11/2003 | Ohta et al. | ............... 73/504.16 |
| 2007/0120449 | A1 | | 5/2007 | Aizawa et al. | |

FOREIGN PATENT DOCUMENTS

| JP | 2001-124561 | 5/2001 |
| JP | 2005-241382 | 9/2005 |
| JP | 2006-17569 | 1/2006 |

* cited by examiner

*Primary Examiner*—Helen C. Kwok
(74) *Attorney, Agent, or Firm*—K&L Gates LLP

(57) ABSTRACT

An angular velocity sensor includes a base portion, three arm portions that extend as one piece from the base portion to an approximately same direction, a piezoelectric film formed on one surface of each of the arm portions, drive electrodes for excitation formed on the piezoelectric films of at least two outer arm portions, and detection electrodes for angular velocity detection formed on the piezoelectric film of at least a center arm portion. Among the three arm portions, the two outer arm portions are excited in phase, and the center arm portion is excited in opposite phase with the two outer arm portions. The drive electrodes excite the arm portions in a first direction vertical to surfaces on which the piezoelectric films are formed. The detection electrodes detect a vibration in a second direction parallel to the surfaces on which the piezoelectric films of the arm portions are formed.

16 Claims, 27 Drawing Sheets

FIG. 2
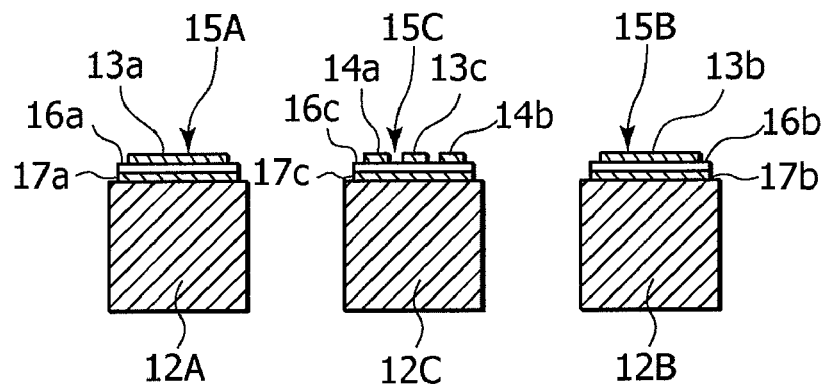
FIG. 3
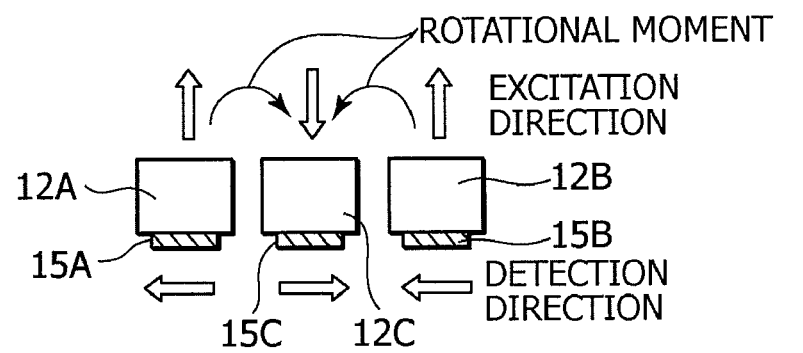
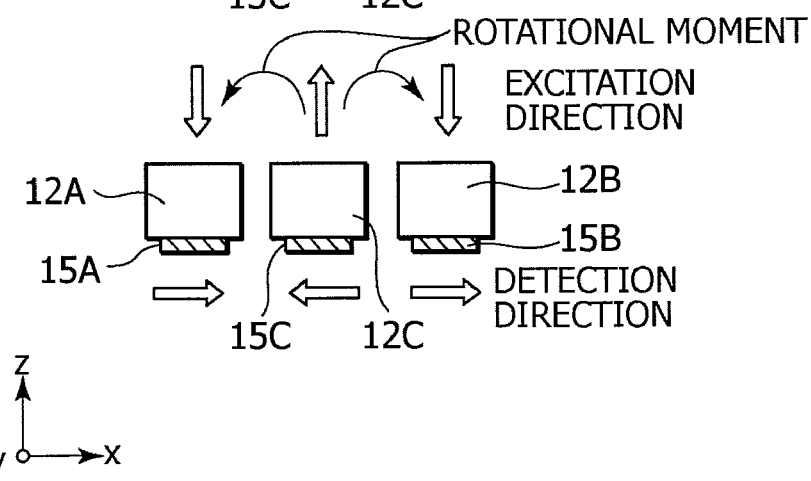

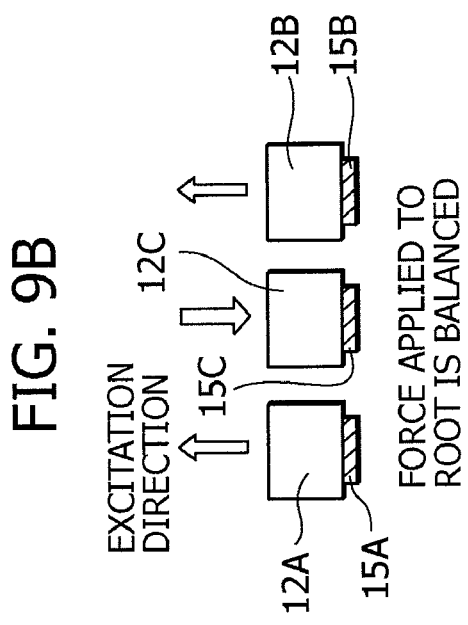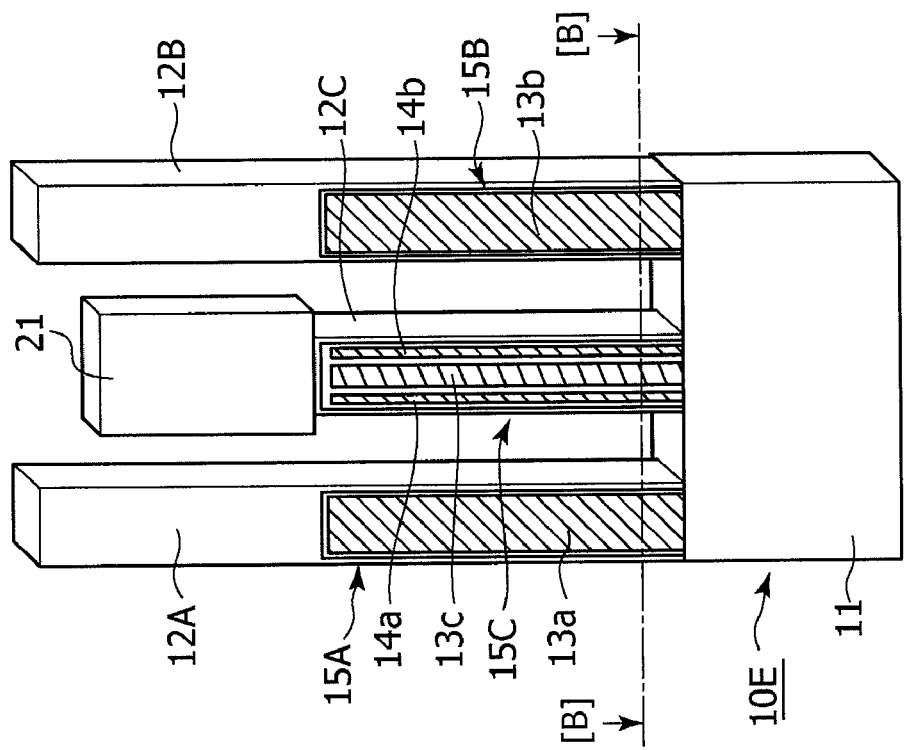

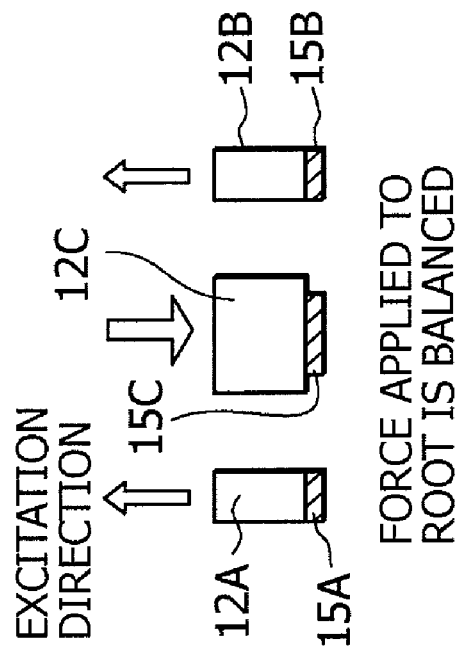
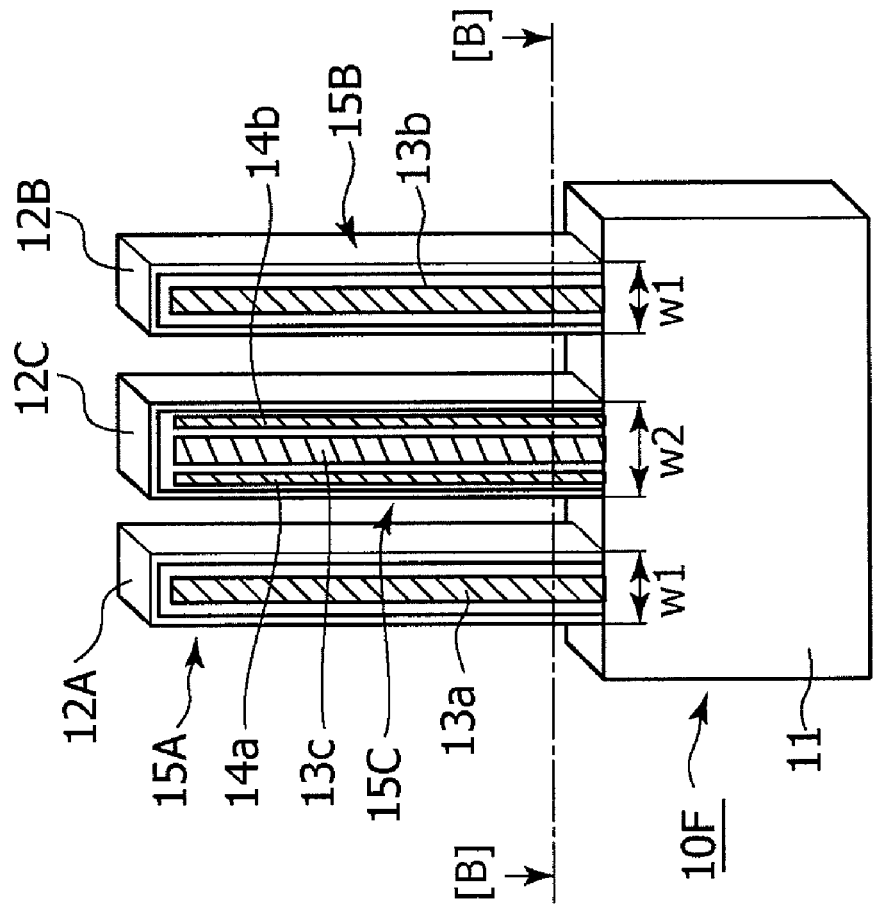

ANGULAR VELOCITY SENSOR AND ELECTRONIC DEVICE

CROSS REFERENCE TO RELATED APPLICATION

The present application claims priority to Japanese Patent Applications Nos. JP2007-067638, JP2006-293589, JP2007-278229, and JP2007-067641 filed in the Japanese Patent Office on Mar. 15, 2007, Oct. 30, 2006, Oct. 25, 2007, and Mar. 15, 2007, respectively, the entire content of which being incorporated herein by reference.

BACKGROUND

The present application relates to an angular velocity sensor used for a camera shake detection in a video camera, a motion detection in a virtual-reality device, and a direction detection in a car navigation system, for example. More particularly, the present invention relates to a three-tuning-fork type angular velocity sensor provided with three vibrator arms.

As related art angular velocity sensors for general use, so-called vibration type gyrosensors have been widely used, in which a vibrator is allowed to oscillate at a predetermined resonant frequency and Coriolis force caused by the influence of an angular velocity is detected by a piezoelectric element or the like, thereby detecting the angular velocity. The vibration type gyrosensor has advantages of a simple mechanism, a short start-up time, and low manufacturing cost. For example, the gyrosensor is builted in electronic devices such as a video camera, a virtual-reality device, and a car navigation system, etc. In this case, the gyrosensor is utilized as a sensor for a camera shake detection, a motion detection, and a direction detection, etc., respectively.

With advancement of miniaturization and higher performance of electronic devices, the vibration type gyrosensors, which are built in such electronic devices, are also required for further miniaturization and higher performance. For example, to achieve multi-functionality of the electronic devices, there is such a demand that the gyrosensor is mounted on the same integrated substrate in combination with various types of sensors used for other purposes to achieve miniaturization. In such a miniaturization, it has become typical to use a fabrication technology called MEMS, in which a structure is formed by using a single-crystal substrate such as silicon (Si), and a thin-film formation process and a photolithography technology employed in a semiconductor manufacturing field (for example, see Japanese Patent Application Publication No. JP2005-241382, hereinafter, referred to as Patent Document 1).

Patent Document 1 discloses a cantilevered angular velocity sensor in which a drive electrode for excitation and a detection electrode for angular velocity detection are each formed on one surface of a single arm portion that forms a vibrator via a piezoelectric film. In the angular velocity sensor, the arm portion is excited in a direction vertical to a surface on which the piezoelectric film is formed, and a vibration component in a direction parallel to that surface is detected as the angular velocity.

In Japanese Patent Application Publication No. JP2006-17569 (hereinafter, referred to as Patent Document 2), there is disclosed a tuning-fork-type angular velocity sensor, in which a drive electrode for excitation and a detection electrode for angular velocity detection are each formed on one surface of each of two arm portions that form a vibrator via a piezoelectric film. In the angular velocity sensor, the arm portion is excited in a direction horizontal to a surface on which the piezoelectric film is formed, and a vibration in a direction vertical to that surface is defined as an angular-velocity detection direction. In Japanese Patent Application Publication No. JP2001-124561 (hereinafter, referred to as Patent Document 3), there is disclosed a three-tuning-fork type angular velocity sensor provided with three arm portions, each of which has a triangular cross-section and forms a vibrator. This angular velocity sensor is configured such that an arraying direction of the arm portions is an excitation direction and a vibration in a direction perpendicular thereto is defined as the angular-velocity detection direction.

However, in angular velocity sensors with the cantilever structure described in Patent Document 1, a rotational moment is generated in a root region of the arm portion when the arm is oscillated, and the resultant vibration is transmitted to a base portion that supports the arm portion, posing an issue that an angular-velocity detection characteristic is deteriorated.

Furthermore, in the tuning-fork-type angular velocity sensors described in Patent Documents 2 and 3, an excitation state of each arm portion, which is a basic mode, is configured such that each arm portion is vibrated and excited in a direction along the surface on which the piezoelectric film is formed. Thus, a center of rigidity of the vibrational excitation by the piezoelectric film is deviated from a center of gravity of the vibrator. Therefore, when a deviation occurs in the drive frequency due to superimposing of a disturbance signal, a vibration surface of the vibrator in a resonant state is easily deviated. As a result, even in a state that there is no angular velocity, detection output may changed. This may significantly increase noise

SUMMARY

Accordingly, it is desirable to provide an angular velocity sensor which is capable of controlling or inhibiting a vibration leakage to a base portion that supports arm portions and is unaffected by noise, and an electronic device including such an angular velocity sensor.

Furthermore, it is desirable to provide an angular velocity sensor capable of generation of noise due to acceleration component such as impacts, and an electronic device including such an angular velocity sensor.

In an embodiment, an angular velocity sensor includes: a base portion; three arm portions that extend as one piece from the base portion to an approximately same direction; a piezoelectric film formed on one surface of each of the arm portions; drive electrodes for excitation formed on the piezoelectric films of at least two arm portions that are positioned on outer sides, among the three arm portions; and detection electrodes for angular velocity detection formed on the piezoelectric film of at least a centrally-positioned arm portion, among the three arm portions. Among the three arm portions, the two arm portions that are positioned on outer sides are excited in phase, and the centrally-positioned arm portion is excited in opposite phase with the two arm portions that are positioned on outer sides. The drive electrodes excite the arm portions in a first direction vertical to surfaces on which the piezoelectric films are formed. The detection electrodes detect a vibration in a second direction parallel to the surfaces on which the piezoelectric films of the arm portions are formed.

The three arm portions form tuning-fork type vibrators. Among the three arm portions, in two arm portions that are positioned on outer sides, vibrations of a basic mode are excited by an inverse piezoelectric effect of piezoelectric films when an AC signal at a drive frequency is applied to drive electrodes. The detection electrodes, which is formed on a centrally-positioned arm portion among the three arm portions, detect a vibration component in a direction vertical to a surface of vibration generated by way of a piezoelectric effect of the piezoelectric film when an angular velocity appears, and outputs the vibration component as an angular velocity signal.

Therefore, in the present embodiment, the two arm portions that are positioned on outer sides are excited in phase with each other, and the centrally-positioned arm portion is excited in opposite phase with the two arm portions that are positioned on outer sides. This configuration generates a rotational moment by vibrations among each of the arm portions. The rotational moment generated between the outer arm portion on one side and the central arm portion and that generated between the outer arm portion on the other side and the central arm portion are opposite in direction to each other. This may permit significant reduction of the vibrations transmitted to the base portion.

In another embodiment, a formation width of the centrally-positioned arm portion may be formed to be larger than those of the two arm portions that are positioned on outer sides. This may allow the rotational moment generated by the vibrations of the arm portions that are positioned on outer sides to be completely cancelled by the rotational moment generated by the vibration of the centrally-positioned arm portion. Alternatively, a vibration plummet may be arranged in the centrally-positioned arm portion, and a similar effect may be obtained.

In the above-described embodiments, the arm portions are excited in the first direction vertical to surfaces on which the piezoelectric films are formed, and vibrations in the second direction parallel to the surfaces on which the piezoelectric films of the arm portions are formed are set to as the detection direction of the angular velocity signal. Thus, the center of rigidity of the vibrational excitation caused by the piezoelectric films agrees with the center of gravity of the arm portions, and a vibration mode is achieved, in which the excitation direction of the arm portions is more stable than the detection direction. As a result, the vibration mode is not easily transferred from the excitation direction to the detection direction when the drive frequency is changed by disturbance. Accordingly, the angular velocity sensor unaffected by external disturbance may be obtained, thereby allowing a high precision output characteristic to be stably obtained.

In another embodiment, the three arm portions may have the same resonant frequency in the first direction, and out of resonant frequencies of the three arm portions in the second direction, only the resonant frequency of the centrally-positioned arm portion is set near the resonant frequency in the first direction. This may enhance a detection accuracy of the angular velocity signal by the detection electrode formed on the centrally-positioned arm portion.

In still another embodiment, an angular velocity sensor includes: a first arm portion, including a first drive electrode, that is excited in a first direction by piezoelectric drive; a second arm portion, including a second drive electrode, arranged to extend in a length direction of the first arm portion, and being excited by piezoelectric drive in the first direction in phase with the first arm portion; a third arm portion, including detection electrodes that detect Coriolis force acted in a second direction perpendicular to the first direction and the length direction, arranged to extend in the length direction between the first arm portion and the second arm portion, and vibrating in opposite phase with vibrations of the first and second arm portions by counteraction of excitation of the first and second arm portions; and a base portion that supports the first, second, and third arm portions.

When an AC signal, which is a drive signal, is applied to the first and second drive electrodes, the first and second arm portions are excited as one piece at a frequency of a predetermined basic mode. The third arm portion vibrates by counteraction caused when the first and second arm portions vibrate. When an external force is applied to the angular velocity sensor while the third arm portion is vibrating, Coriolis force is detected by the detection electrodes, and an angular velocity is detected.

In the present embodiment, a rotational moment generated by the first arm portion and the third arm portion and that generated by the second arm portion and the third arm portion are opposite in direction to each other. Therefore, the vibrations (vibration leakage) transmitted from the first to third arm portions to the base portion may be significantly reduced.

In another embodiment, the base portion may include: a support portion that supports the first, second, and third arm portions; a fixing portion, including external connecting terminals for external connection of the first drive electrode, the second drive electrode, and the detection electrodes, formed in the second direction by a first width; and a connection portion, formed in the second direction by a second width smaller than the first width, for connecting the support portion and the fixing portion.

In an embodiment, a width of the connection portion is smaller than that of the fixing portion, and thus, the connection portion serves as a cushioning material. As a result, the vibrations of the first, second, and third arm portions (hereinafter, may be referred to as "each arm portion") are not easily transmitted to the fixing portion. In this case, typically, a thickness of each arm portion and that of the base portion are substantially the same. Alternatively, in the present invention, even when the thickness of each arm portion and that of the base portion are not the same, a similar effect may be obtained when a volume of the connection portion is designed to be smaller than that of the fixing portion. In other words, widths of the fixing portion and the cushioning portion may not necessarily be the same as the first and second widths.

In other words, the tuning-fork type angular velocity sensor including three arm portions according to the present embodiment includes a plurality of vibration systems. Out of the plurality of vibration systems, there are two vibration systems to be noticed as measures against vibration leakage. A first vibration system is a vibration system composed of each arm portion and the support portion. A second vibration system is a vibration system composed of each arm portion, the support portion, and the connection portion. Therefore, a resonant frequency of the second vibration system (second resonant frequency) is smaller than that of the first vibration system (first resonant frequency). As a result, a vibration leakage may be inhibited. Even when a vibration by external disturbance which is closer to the first resonant frequency than the second resonant frequency is applied to the angular velocity sensor, the vibration by the external disturbance becomes readily absorbable by the second vibration system, allowing a high precision output characteristic to be stably obtained.

In another embodiment, the following relationship is satisfied: $0.25 \leq (f0/fv) \leq 1/\sqrt{2}$, where fv is a resonant frequency of a first vibration system in the first direction of the first and second arm portions, the vibration system including the first, second, third arm portions, and the support portion, and f0 is a resonant frequency of a second vibration system in the first direction, the vibration system including the first, second, and third arm portions, the support portion, and the connection portion. When f0/fv is lower than 0.25, the connection portion may be fractured by an exciting force by the vibration of each arm portion or an impact force from outside applied to the angular velocity sensor. Such a condition corresponds to, for example, a case where it is necessary that the second width be designed to be small and the length direction of the connection portion (length direction of each of the arm portions) be designed to be long. In other words, in this case, the connection portion may be made thin or narrow. On the other hand, when f0/fv is higher than $1/\sqrt{2}$, the vibration leakage prevention mechanism may not be fully functioned.

In another embodiment, the first and the second arm portions may be excited by a first resonant frequency, and the third arm portion may include a vibration system of a second resonant frequency lower by 1 kHz to 2 kHz than the first resonant frequency. When the second resonant frequency is close to the first resonant frequency, that is, when a difference between the first and second resonant frequency is lower than 1 kHz, a vibration of the third arm portion by the second resonant frequency results in being noise. As a result, the detection precision by the detection electrodes deteriorates. When the difference between the first and second resonant frequencies is higher than 2 kHz, a shape, a size, or the like of the third arm portion deviates from a predetermined appropriate range. As a result, a balance of the resonant frequencies in the first and second directions of the third arm portion deteriorates, thereby leading to deterioration of a temperature characteristic of the angular velocity sensor.

In another embodiment, an angular velocity sensor includes: a first arm portion that includes a first drive electrode and is excited in a first direction by piezoelectric drive; a second arm portion including a second drive electrode, arranged to extend in a length direction of the first arm portion, and being excited in the first direction in phase with the first arm portion by piezoelectric drive; a third arm portion including detection electrodes for detecting Coriolis force acted in a second direction perpendicular to the first direction and the length direction, arranged to extend in the length direction between the first arm portion and the second arm portion, and being excited by piezoelectric drive in opposite phase with the first and the second arm portions, and a base portion that supports the first, second, and third arm portions.

According to such a structure, vibration leak or vibration transmitted from the first to third arm portions to the base portion may be greatly reduced.

In the angular velocity sensor, the third arm portion may include, as the detection electrodes: a first detection electrode; and a second electrode disposed symmetrically to the first detection electrode about an axis of the first direction of the third arm portion. The first arm portion may include a third detection electrode that detects Coriolis force acted on the first arm portion. The second arm portion may include a fourth detection electrode that detects Coriolis force acted on the second arm portion. The angular velocity sensor may further include a controller that calculates a first sum signal of an output signal from the first detection electrode and an output signal from the third detection electrode, and a second sum signal of an output signal from the second detection electrode and an output signal from the fourth detection electrode, respectively, and that detects a differential signal of the first sum signal and the second sum signal as a angular velocity signal.

According to such an structure, the differential signal of the first sum signal and the second sum signal is detected as the angular velocity signal. When an acceleration such as an impact is applied on the angular velocity sensor, the angular velocity signal may be cancelled and generation of noise due to such an acceleration may be avoided.

In another embodiment of the present invention, an electronic device includes: a main body; and an angular velocity sensor, in which the angular velocity sensor includes: a first arm portion, including a first drive electrode, that is excited in a first direction by piezoelectric drive; a second arm portion, including a second drive electrode, arranged to extend in a length direction of the first arm portion, and being excited by piezoelectric drive in the first direction in phase with the first arm portion; a third arm portion, including detection electrodes that detect Coriolis force acted in a second direction perpendicular to the first direction and the length direction, arranged to extend in the length direction between the first arm portion and the second arm portion, and vibrating in opposite phase with vibrations of the first and second arm portions by counteraction of excitation of the first and second arm portions; and a base portion that supports the first, second, and third arm portions, and the angular velocity sensor is disposed in the main body.

In still another embodiment of the present invention, an electronic device includes: a main body; and an angular velocity sensor. The angular velocity sensor includes: a first arm portion that includes a first drive electrode and is excited in a first direction by piezoelectric drive; a second arm portion including a second drive electrode, arranged to extend in a length direction of the first arm portion, and being excited in the first direction in phase with the first arm portion by piezoelectric drive; a third arm portion including detection electrodes for detecting Coriolis force acted in a second direction perpendicular to the first direction and the length direction, arranged to extend in the length direction between the first arm portion and the second arm portion, and being excited by piezoelectric drive in opposite phase with the first and the second arm portions, and a base portion that supports the first, second, and third arm portions. The angular velocity sensor is disposed within the main body.

As described above, according to the present invention, it is possible to achieve a stable angular-velocity detection operation in which a vibration of each arm portion is prevented from being transmitted to a base portion, and form a robust angular velocity sensor unaffected by external disturbance.

Additional features and advantages are described herein, and will be apparent from, the following Detailed Description and the figures.

BRIEF DESCRIPTION OF THE FIGURES

FIG. 2 is a cross-sectional view of relevant parts taken along a line [2] to [2] in FIG. 1;

FIG. 3 is a frontal view of relevant parts of arm portions, for describing an operation of the angular velocity sensor of FIG. 1;

FIG. 9 is a schematic block diagram of an angular velocity sensor according to a fifth embodiment;

FIG. 10 is a schematic block diagram of an angular velocity sensor according to a sixth embodiment;

DETAILED DESCRIPTION

With reference to the drawings, embodiments of the present application are described. The present application is not limited to each of the embodiments below, and various modifications may be possible based on a technological idea of the present application.

First Embodiment

Figure 1:
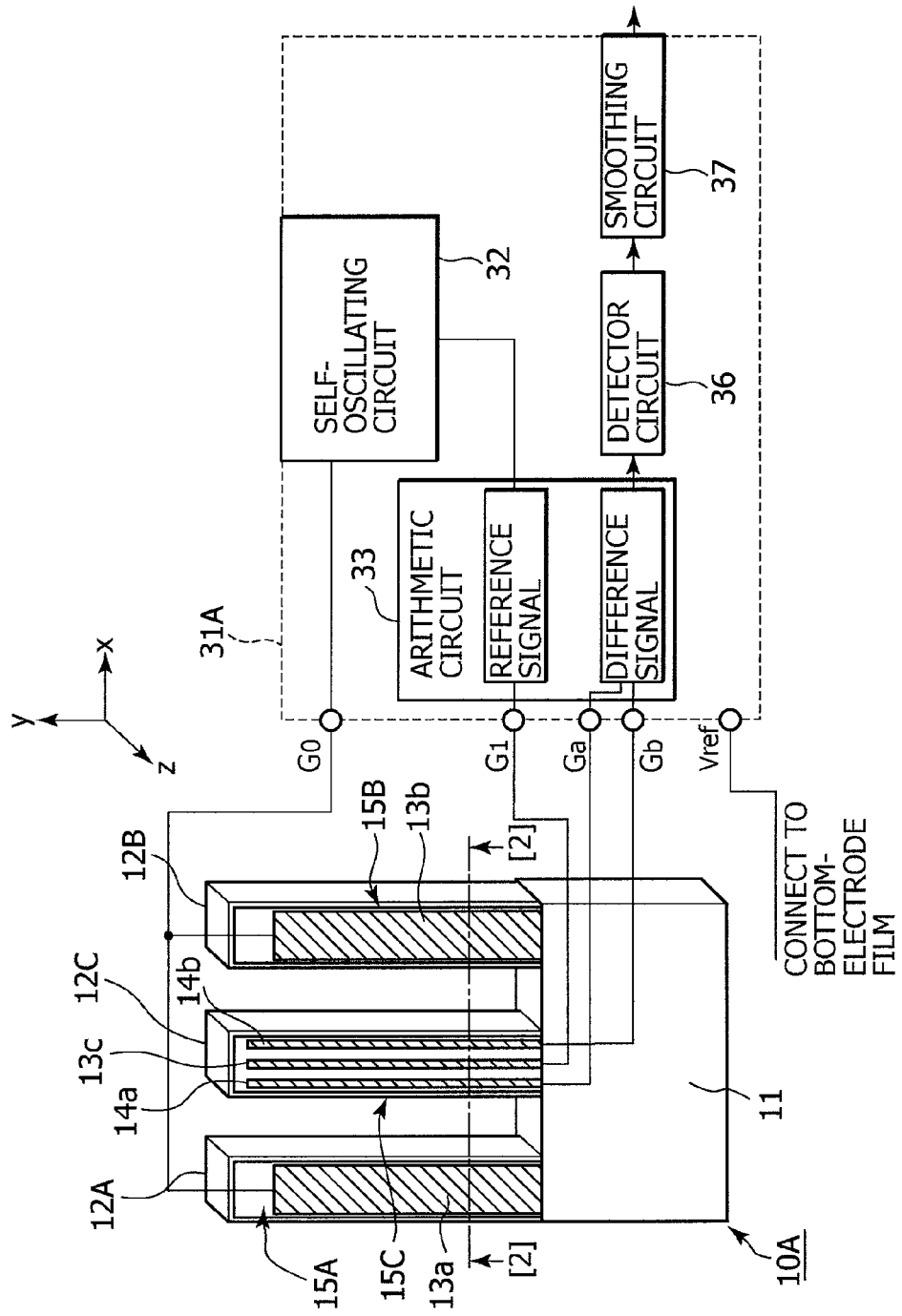
FIG. 1 is a schematic block diagram of an angular velocity sensor according to a first embodiment.

FIG. 1 is a bottom view showing a schematic configuration of an angular velocity sensor 10A according to a first embodiment. The angular velocity sensor 10A according to this embodiment includes: a base portion 11; and three arm portions 12A (first arm portion), 12B (third arm portion), and 12C (second arm portion), each having a square cross section extruding as one piece from the base portion 11 in the approximately identical direction (y axis direction). The y axis direction corresponds to length directions of the three arm portions 12A, 12B, and 12C. The base portion 11 and the arm portions 12A to 12C are cut from a single crystal substrate without a piezoelectric characteristic, such as a silicon wafer, into predetermined shapes, and one surface is formed with a piezoelectric functional layer described later and various lead wirings thereby to obtain the angular velocity sensor 10A. The angular velocity sensor 10A is approximately sized to be about 1 mm in width in a z axis direction, about 3 mm in whole length in the y axis direction, and about 0.3 mm in thickness in the z axis direction.

The arm portions 12A to 12C form vibrators of the angular velocity sensor 10A. In this embodiment, each arm portion 12A to 12C is configured with the identical arm length, formation width, and formation thickness, for example, but needless to say, it is not limited thereto. In the descriptions that follow, among the three arm portions 12A to 12C, the two arm portions that are positioned on outer sides 12A and 12B are each referred to as outer arm portions 12A and 12B, and the centrally-positioned arm portion 12C is referred to as a center arm portion.

FIG. 2 is a cross-sectional view in a direction of a line taken along [2] to [2] in FIG. 1, and shows a cross-sectional shape of each arm portion 12A to 12C. One surfaces of the outer arm portions 12A and 12B are formed with piezoelectric functional layers 15A and 15B, respectively. The piezoelectric functional layers 15A and 15B are including: bottom electrode films 17a and 17b formed on the outer arm portions 12A and 12B; piezoelectric films 16a and 16b formed on the bottom electrode films 17a and 17b; and drive electrodes 13a (first drive electrode) and 13b (second drive electrode) formed on the piezoelectric films 16a and 16b.

On the other hand, one surface of the center arm portion 12C is formed with a piezoelectric functional layer 15C. The piezoelectric functional layer 15C includes: a bottom electrode film 17c formed on the center arm portion 12C; a piezoelectric film 16c formed on the bottom electrode film 17c; and a reference electrode 13c and detection electrodes 14a (first detection electrode) and 14b (second detection electrode) formed on the piezoelectric film 16c. The detection electrodes 14a and 14b each are formed symmetrically about the reference electrode 13c disposed on an axis of the center arm portion 12C.

The bottom electrode films 17a to 17c are each formed as a multi-layered film of Ti (titan) and Pt (platinum), which is formed on a Si substrate by a sputtering method, and are formed among the arm portions 12A to 12C as common electrode films in the piezoelectric functional layers 15A to 15C. The piezoelectric films 16a to 16c are formed by RF sputtering using a PZT (lead zirconium titanate) target under an oxygen atmosphere, for example. The drive electrodes 13a and 13b, the reference electrode 13c, the detection electrodes 14a and 14b are formed by patterning Pt films formed on the piezoelectric films 16a to 16c into respective electrode shapes by using a photolithography technology. After the formation of the electrode patterns, the piezoelectric films 16a to 16c are also patterned to match the above-described electrode shapes.

The angular velocity sensor 10A is driven and controlled by a controller 31A such as an IC circuit element. The bottom electrode films 17a to 17c of the arm portions 12A to 12C are each connected to a Vref terminal of the controller 31A. The Vref terminal forms a ground terminal, which serves as a reference electrode. The drive electrodes 13a and 13b on the outer arm portions 12A and 12B fare each connected to a G0 terminal of the controller 31A, and are input drive signals generated in a self-oscillating circuit 32. The reference electrode 13c that detects a vibration characteristic of the center arm portion 12C is connected to a G1 terminal, and the detection electrodes 14a and 14b are connected to Ga and Gb terminals, respectively. The Ga, Gb, and G1 terminals are connected to an arithmetic circuit 33 which feeds back output of the reference electrode 13c to the self-oscillating circuit 32 as a drive-use signal and outputs a difference signal of the detection electrodes 14a and 14b to a detector circuit 36 as an angular velocity signal. A detection signal which goes through a signal processing in the detector circuit 36 is supplied to a smoothing circuit 37, and thereafter, the resultant signal is processed as the angular velocity signal.

Although not described in detail, the angular velocity sensor 10A is connected via a mounting substrate not shown in the figure to the controller 31A. In this embodiment, the angular velocity sensor 10A is flip-chip mounted on a mounting substrate on which mounted are IC elements configuring the controller 31A. A plurality of bumps used for the flip-chip mounting are formed in the base portion 11 of the angular velocity sensor 10A. On a mounting surface of the base portion 11, lead wirings (not shown in the figure) for electrically connecting between the piezoelectric functional layers 15A to 15C of the respective arm portions 12A to 12C and the plurality of bumps.

FIGS. 3A and 3B show a vibrating mode of each arm portion 12A to 12C when the angular velocity sensor 10A is operated. The drive electrodes 13a and 13b on the outer arm portions 12A and 12B are each input common drive signals. Thereby, by an inverse-piezoelectric effect of the piezoelectric films 16a and 16b, the outer arm portions 12A and 12B are excited in phase with each other in a direction (z axis direction) vertical to film surfaces of the piezoelectric functional layers 15A and 15B (piezoelectric films 16a and 16b), as shown in FIGS. 3A and 3B.

Counteracted by vibrations of the outer arm portions 12A and 12B, the center arm portion 12C vibrates also in the z axis direction in opposite phase with the outer arm portions 12A and 12B. At this time, by a piezoelectric effect of the piezoelectric film 16c, the reference electrode 13c and the detection electrodes 14a and 14b electrically detect a vibration characteristic of the arm portion 12C. A reference signal detected via the reference electrode 13c is fed back to the self-oscillating circuit 32 within the controller 31A. A difference signal of the detection signal detected via the detection electrodes 14a and 14b is processed as the angular velocity signal. When the angular velocity is not applied, the difference signal of the detection electrodes 14a and 14b are, in principle, 0 (zero).

On the other hand, in this state, when the angular velocity is acted around the y axis direction, Coriolis force occurs in each arm portion 12A and 12B, and components that vibrate each arm portion 12A to 12C in a direction (x axis direction) parallel to the surfaces, on which the piezoelectric functional layers 15A to 15C are formed, are generated. The vibration components are detected by the detection electrodes 14a and 14b by utilizing the piezoelectric effect of the piezoelectric film 16c on the center arm portion 12C, and based on the difference signal of the vibration components, a size and a direction of the angular velocity are detected.

In this embodiment, an operation frequency of each arm portion 12A to 12C, that is, a resonant frequency fv in the z axis direction in a basic mode (hereinafter, referred to as a "vertical resonant frequency"), is set to the identical frequency. Out of detection frequencies of the angular velocity, that is, resonant frequencies fh in the x axis direction of each arm portion 12A to 12C (hereinafter, referred to as a "horizontal resonant frequency"), only that of the center arm portion 12C is set near the vertical resonant frequency fv. The horizontal resonant frequencies fh of the outer arm portions 12A and 12B are set to different frequencies from the vertical resonant frequency fv, separated by several hundreds of Hz to several kilo Hz.

As described above, in the angular velocity sensor 10A in this embodiment, when vibrated in the basic mode, the outer arm portions 12A and 12B are excited in phase with each other, and the center arm portion 12C is excited in opposite phase with the outer arm portions 12A and 12B. In the angular velocity detection, the vibration direction of the center arm portion 12C is again opposite to those of the outer arm portions 12A and 12B. Therefore, according to this embodiment, a rotational moment is generated by the vibrations between each arm portion 12A to 12C. The rotational moment generated between the outer arm portion 12A on one side and the center arm portion 12C and that generated between the outer arm portion 12B on the other side and the center arm portion 12C are opposite in direction to each other. As a result, the vibrations transmitted to the base portion 11 may be significantly reduced. This may permit inhibiting of a vibration leakage to the base portion 11 that supports the arm portions 12A to 12C, and prevent deterioration of an angular-velocity detection characteristic.

In the angular velocity sensor 10A in this embodiment, an excitation direction of each arm portion 12A to 12C by the drive electrodes 13a and 13b is set to a direction (z axis direction) vertical to the surfaces on which the piezoelectric functional layers 15A to 15C are formed. As a result, unlike in the detection direction (x axis direction), the arm portions may be allowed to vibrate in an inherently stable vibration mode. In other words, the center of rigidity of the vibrational excitation caused by the piezoelectric films 16a and 16b agrees with the center of gravity of the arm portions 12A and 12B. As a result, the arm portions 12A and 12B are excited in the first direction (z axis direction) vertical to the surfaces, on which the piezoelectric functional layers 15A and 15B are formed, more easily than in the second direction (x axis direction) parallel to the surfaces on which the piezoelectric functional layers 15A and 15B are formed. This may permit inhibiting of a vibration transfer to the second direction even when the drive frequency is changed by superimposition of disturbance, and maintaining of a stable basic mode. Thus, an angular velocity sensor immune to the disturbance may be obtained, and therefore, a precision output characteristic may be stably obtained.

Further, in this embodiment, the horizontal resonant frequency fh of the center arm portion 12C alone is set near the vertical resonant frequency fv, and the horizontal resonant frequencies fh of the outer arm portions 12A and 12B are set apart from the vertical resonant frequency fv. Thus, improvement of detection precision of the angular velocity may be implemented, and at the same time, stabilization of the vibration direction when the outer arm portions 12A and 12B are operated in the basic operation mode may be implemented.

Figure 4:
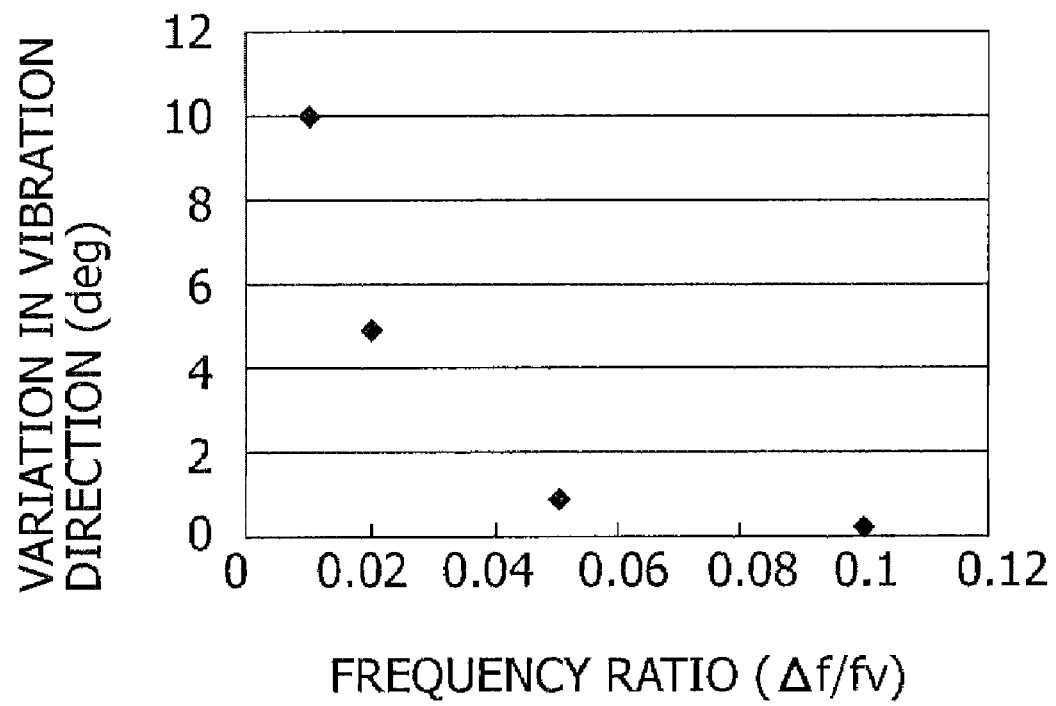
FIG. 4 is a graph showing a relationship between a frequency ratio of an outer arm portion and variance in vibration direction in the angular velocity sensor of FIG. 1.

When the horizontal resonant frequencies fh of the outer arm portions 12A and 12B are designed to be set further apart from its vertical resonant frequency fv, variance in the vibration direction may be better prevented. FIG. 4 shows a relationship between a magnitude of Δf/fv and variance (3σ) in a vibration direction of the arm portion under excitation, where Δf is a value of |fv−fh|. As seen from FIG. 4, the larger Δf, that is, when fh is set further apart from fv, more easily it becomes to implement stabilization of the vibration direction of the arm portion. In particular, in this example, when Δf/fv is 0.1, the deviation in the vibration direction can be contained nearly to zero.

Second Embodiment

Figure 5:
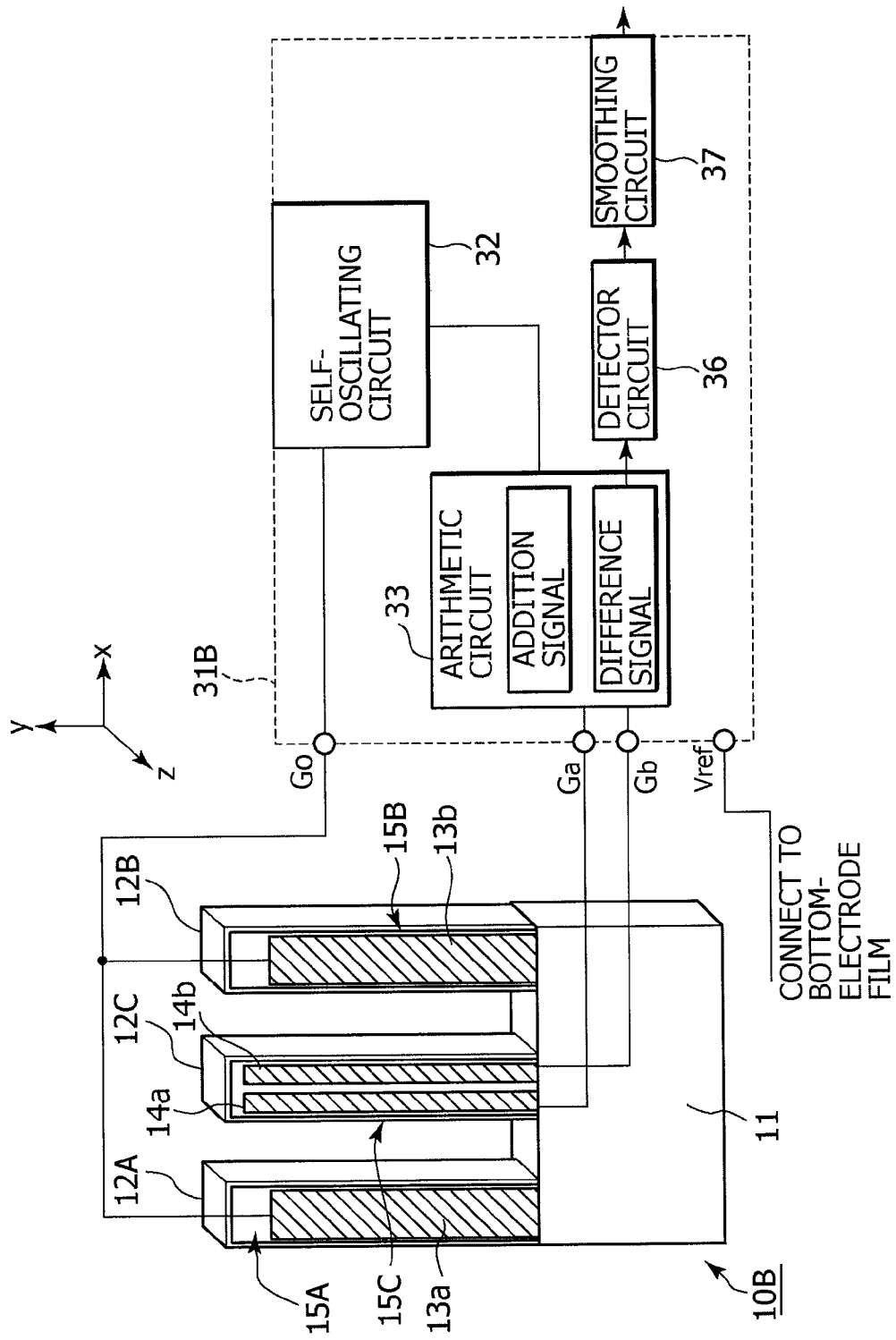
FIG. 5 is a schematic block diagram of an angular velocity sensor according to a second embodiment.

FIG. 5 shows a configuration of an angular velocity sensor 10B according to a second embodiment. It is noted that in the figure, portions that correspond to those in the above-described first embodiment are designated by like reference numerals to omit its detailed descriptions.

The angular velocity sensor 10B of this embodiment differs in configuration from that of the first embodiment in that the piezoelectric functional layer 15B of the center arm portion 12C is not formed with the reference electrode. In this embodiment, the arithmetic circuit 33 within a controller 41B includes an adder and a differential amplifier, a sum signal of a pair of detection electrodes 14a and 14b is computed by the adder to be fed back to the self-oscillating circuit 32, a difference signal of the pair of detection electrodes 14a and 14b is output to the detector circuit 36 to be processed as the angular velocity signal.

In the thus obtained angular velocity sensor 10B of this embodiment, an effect similar to that of the above-described first embodiment may be obtained.

Third Embodiment

As described above, the detection electrodes are arranged not only in the center arm portion 12C but also in the outer arm portions 12A and 12B, and thus, it may become possible to enhance the detection precision of the angular velocity signal. In this case, the arithmetic circuit 33 within the controller 31C is configured to output a sum signal of (Gd+Gb)+(Ga+Gc), as the drive-use signal, to the self-oscillating circuit 32, and at the same time, output a difference signal of (Gd+Gb)−(Ga+Gc), as the angular velocity signal, to the detector circuit 36, where Ga, Gb, Gc, and Gd represent detection signals of the detection electrodes 14a, 14b, 14c, and 14d, respectively.

The angular velocity sensor 10C of this embodiment differs from that of the above-described first embodiment in that in addition to the pair of detection electrodes 14a and 14b formed on the center arm portion 12C, each one of detection electrodes 14c and 14d is formed on the outer arm portions 12A and 12B, respectively. The center arm portion 12C is configured similarly to that of the above-described second embodiment.

Figure 6:
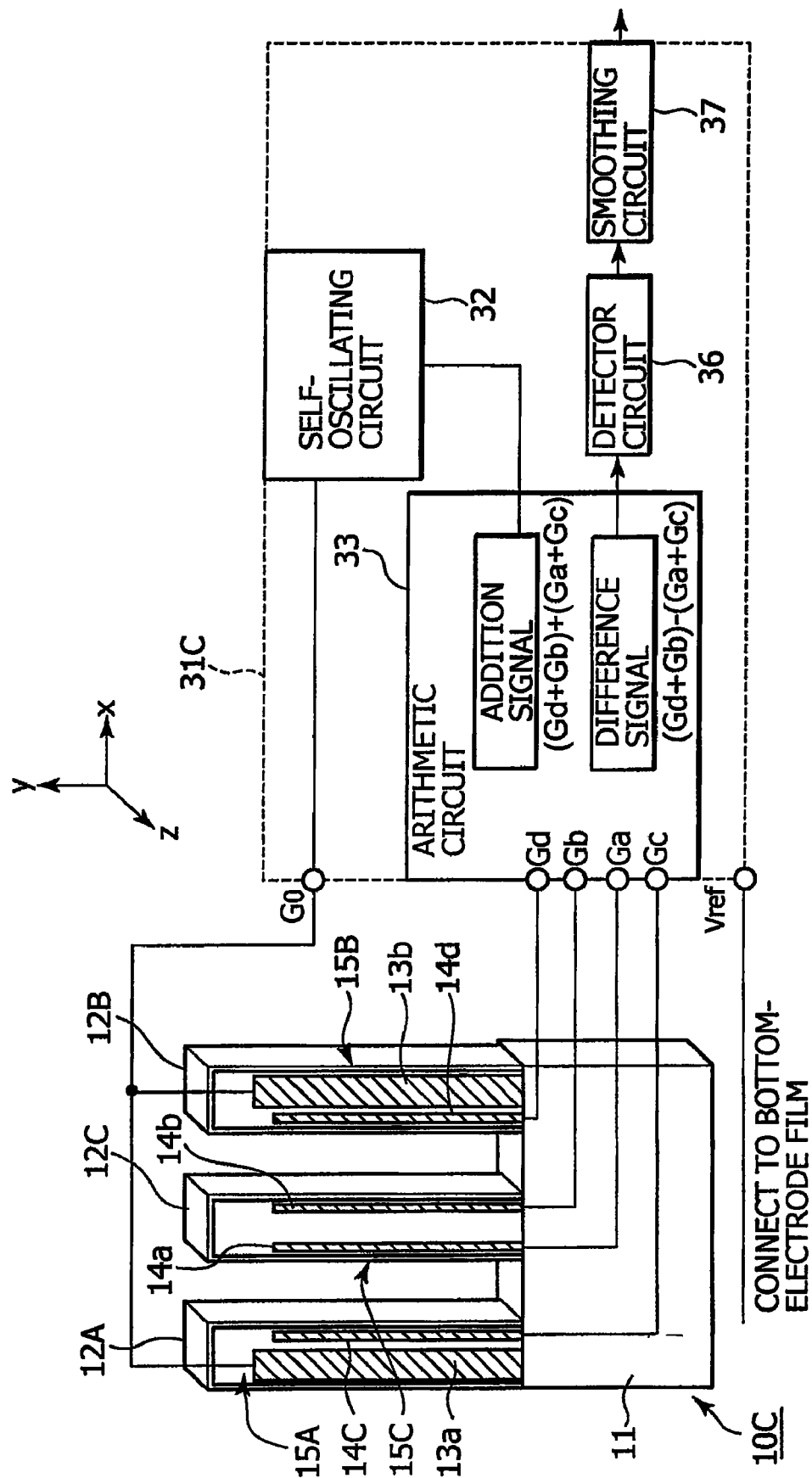
FIG. 6 is a schematic block diagram of an angular velocity sensor according to a third embodiment.

The detection electrode 14c is formed as the piezoelectric functional layer 15A formed on the outer arm portion 12A on one side (on the left side in FIG. 6) in a position closer to the center arm portion 12C from the drive electrode 13a. The detection electrode 14d is formed as the piezoelectric functional layer 15B formed on the outer arm portion 12B on the other side (on the right side in FIG. 6) in a position closer to the center arm portion 12C from the drive electrode 13b. The detection electrodes 14a, 14b, 14c, and 14d are connected to Ga, Gb, Gc, and Gd terminals of a controller 31C, respectively.

As described above, the detection electrodes are arranged not only in the center arm portion 12C but also in the outer arm portions 12A and 12B, and thus, it may become possible to enhance the detection precision of the angular velocity signal. In this case, the arithmetic circuit 33 within the controller 31C is configured to output a sum signal of (Gd+Gc)−(Gb+Ga), as the drive-use signal, to the self-oscillating circuit 32, and at the same time, output a difference signal of (Gd+Gb)−(Ga+Gc), as the angular velocity signal, to the detector circuit 36, where Ga, Gb, Gc, and Gd represent detection signals of the detection electrodes 14a, 14b, 14c, and 14d, respectively.

Fourth Embodiment

Figure 7A:
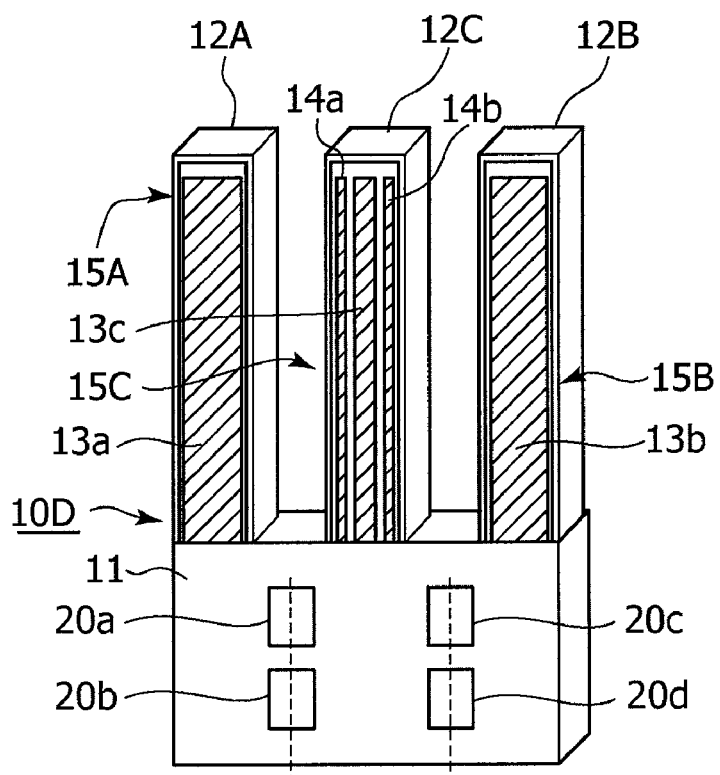
FIG. 7 is a schematic block diagram of an angular velocity sensor according to a fourth embodiment.

FIG. 7A shows a schematic configuration of an angular velocity sensor 10D according to a fourth embodiment. It is noted that in the figure, portions that correspond to those in the above-described first embodiment are designated by like reference numerals to omit its detailed descriptions.

The angular velocity sensor 10D of this embodiment includes a plurality of bumps 20a, 20b, 20c, and 20d for flip-chip mounting on a mounting substrate not shown. The bumps 20a to 20d are arranged on a rear surface side of the base portion 11, and although not shown in the figure, electrically connected to the corresponding piezoelectric functional layers 15A to 15C on the arm portions 12A to 12C via lead wirings pattern-formed on the rear surface side of the base portion 11. In other words, the bumps 20a to 20d form external connecting terminals for inputting and outputting a signal to each arm portion 12A to 12C. In an example shown in FIG. 7A, although the number of bumps is 4, the number of bumps to be formed is not limited thereto.

In particular, in the angular velocity sensor 10D of this embodiment, on the rear surface of the base portion 11, each bump 20a to 20d is formed at a position of minimum vibration between the three arm portions 12A to 12C. Thus defining of a formation position of each bump 20a to 20d may permit inhibiting of vibration leakage to the mounting substrate when in operation.

Figure 7B:
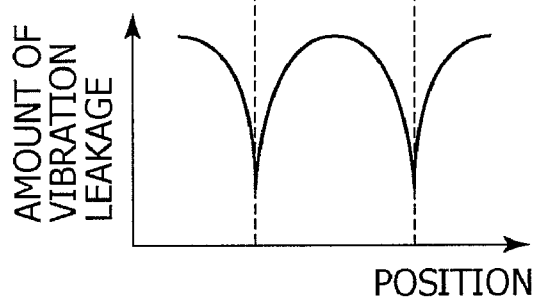
Figure 8:
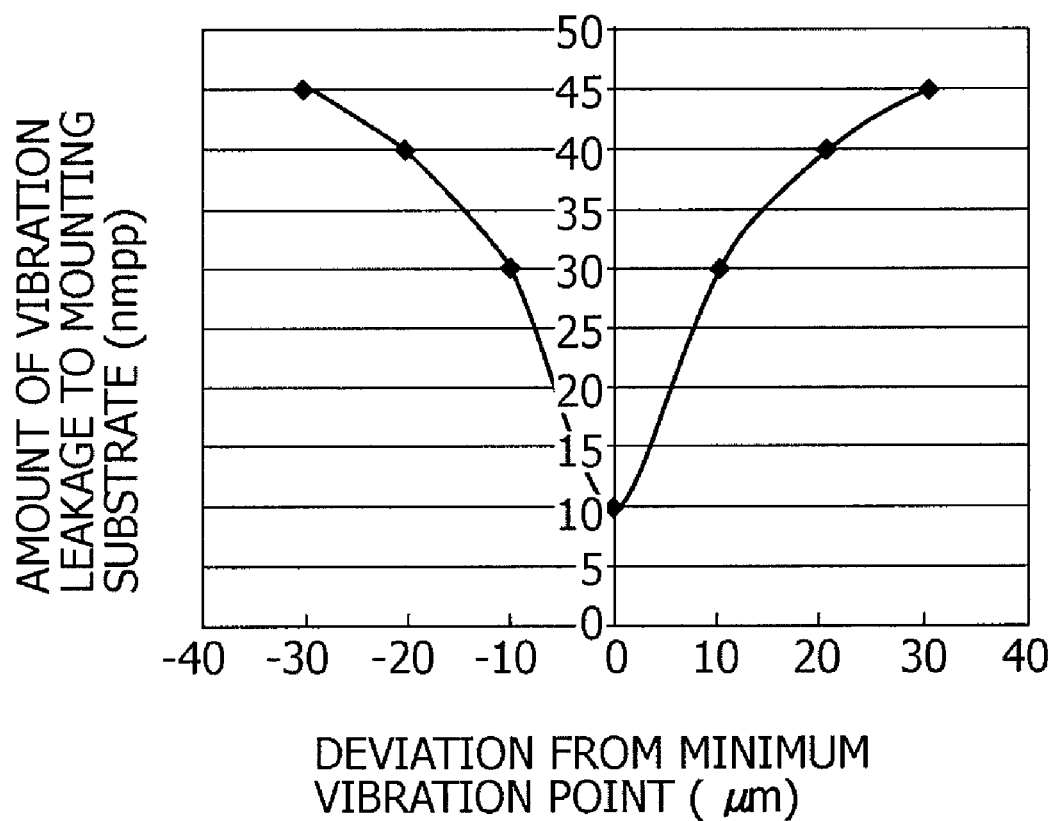
FIG. 8 is a graph showing a relationship between a bump position and an amount of vibration leakage in the angular velocity sensor of FIG. 7.

FIG. 7B shows a relationship between each position in a width direction of the base portion 11 and an amount of vibration leakage from the arm portions 12A to 12C. As shown in FIG. 7B, in the corresponding position on an extended line of an axis of each arm portion 12A to 12C, the maximum amount of vibration leakage is produced. Therefore, in this embodiment, the bumps 12A to 12C are designed not to be formed on the extended lines of the axes of the three arm portions 12A to 12C, that is, formed to be deviated from the extended lines. Preferably, the bumps 20a to 20d are disposed in positions among the arm portions where the minimum amount of vibration leakage is produced, as shown in FIG. 7. FIG. 8 shows a relationship example between a formation position of the bump and an amount of vibration leakage transmitted to the mounting substrate. It is seen from the graph that the amount of vibration leakage greatly changes depending on the bump position.

Fifth Embodiment

FIG. 9A shows a schematic configuration of an angular velocity sensor 10E according to a fifth embodiment. It is noted that in the figure, portions that correspond to those in the above-described first embodiment are designated by like reference numerals to omit its detailed descriptions.

The angular velocity sensor 10E of this embodiment differs from that of the above-described first embodiment in that a vibration plummet 21 is arranged in the center arm portion 12C. In this embodiment, the vibration plummet 21 is formed as one piece at a distal end of the center arm portion 12C. However, the formation position of the vibration plummet 21 is not limited thereto. The arrangement of the vibration plummet 21 in the center arm portion 12C allows a vibration force of the center arm portion 12C to be greater than those of the outer arm portions 12A and 12B, as shown in FIG. 9B. Therefore, when the design of the vibration plummet 21 is optimized, the vibrations generated by the two outer arm portions 12A and 12B may be cancelled by the single center arm portion 12C. Thereby, the vibrations transmitted to root regions of the arm portions 12A to 12C can be cancelled by balance of forces, and as a result, the vibration leakage to the base portion 11 and the mounting substrate may be greatly reduced.

In the angular velocity sensor 10E of this embodiment, when the vibration plummet 21 is arranged, the resonant frequency of the center arm portion 12C is lowered, and thus, in order to tune the resonant frequencies of the three arm portions 12A to 12C, an arm length of the center arm portion 12C is made shorter than those of the outer arm portions 12A and 12B. In this example, formation widths of the outer arm portions 12A and 12B may be rendered large, and thus, formation widths of the drive electrodes 13a and 13b may also be rendered large. As a result, vibrational amplitudes of the arm portions are rendered large to implement an improvement of the angular-velocity detection characteristic.

Sixth Embodiment

FIG. 10A is a schematic block diagram of an angular velocity sensor 10F according to a sixth embodiment. It is noted that in the figure, portions that correspond to those in the above-described first embodiment are designated by like reference numerals to omit its detailed descriptions.

The angular velocity sensor 10F of this embodiment differs from that of the above-described first embodiment in that a formation width W2 (second width) of the center arm portion 12C is formed to be larger than formation widths W1s (first widths) of the outer arm portions 12A and 12B. This configuration allows a vibration force of the center arm portion 12C to be larger than those of the outer arm portions 12A and 12B, as shown in FIG. 10B. As a result, the optimization of the formation width of the center arm portion 12C (for example, W2=2W1 is arranged) may allow the vibrations generated by the two outer arm portions 12A and 12B to be cancelled by the single center arm portion 12C. Thereby, the vibrations transmitted to the root regions of the arm portions 12A to 12C may be canceled by balance of forces, and as a result, the vibration leakage to the base portion 11 and the mounting substrate may be greatly reduced.

In this embodiment, although the arm length of the center arm portion 12C is made equal to those of the outer arm portions 12A and 12B, needless to say, is not limited thereto. For example, the arm length of the center arm portion 12C may be made longer than those of the outer arm portions 12A and 12B to implement tuning of the resonant frequencies.

Figure 11:
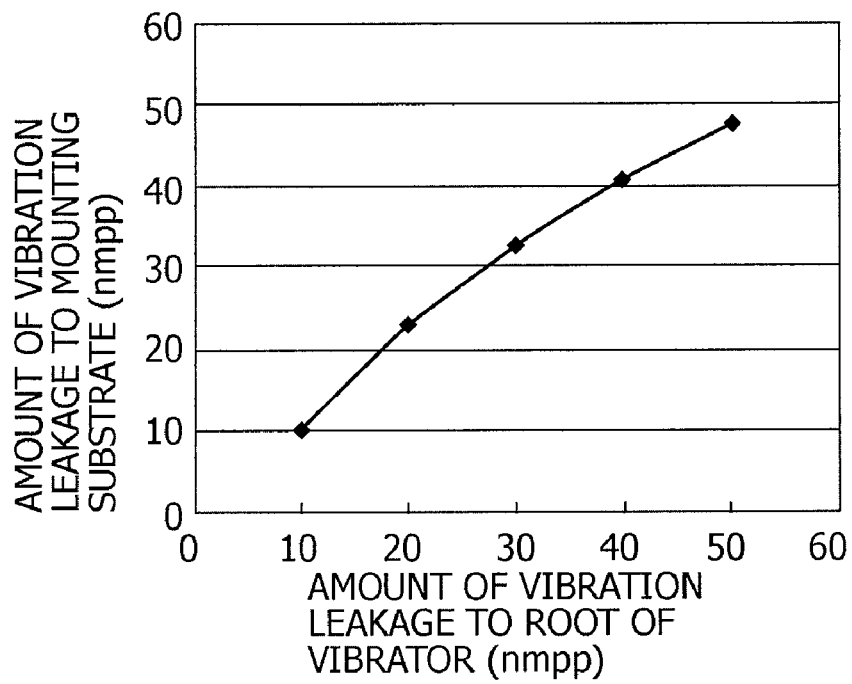
FIG. 11 is a graph showing a relationship between an amount of vibration leakage transmitted to a root region of the arm portion (vibrator), and an amount of vibration leakage to a mounting substrate in the angular velocity sensor according to the first embodiment.
Figure 12:
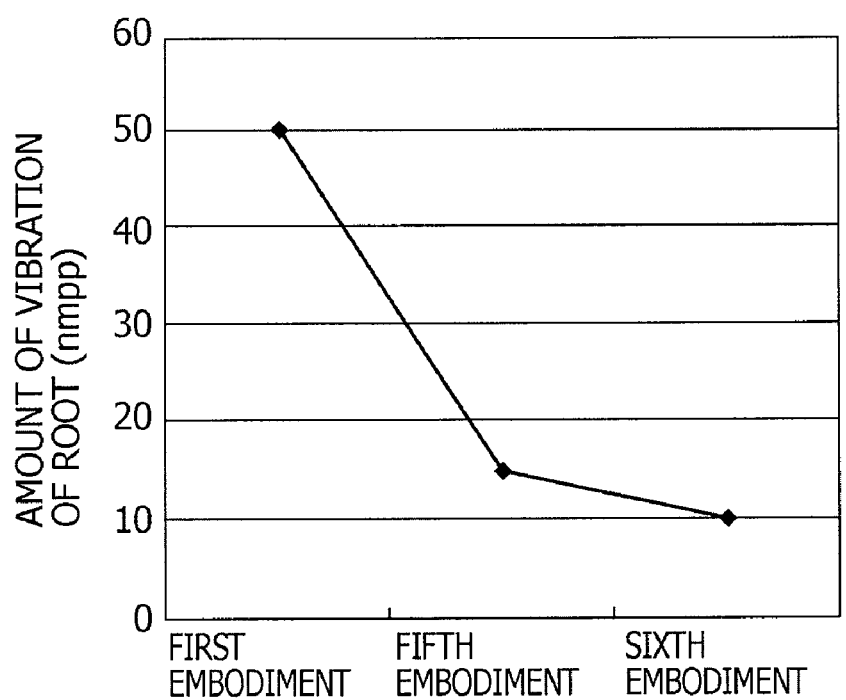
FIG. 12 is a graph showing comparisons among the amounts of vibration leakage in the root regions of the arm portions in the angular velocity sensors of the first, the fifth, and the sixth embodiments.

FIG. 11 shows one example of a relationship between an amount of vibration leakage transmitted to the root region of the arm portion (vibrator), and an amount of vibration leakage to the mounting substrate in the angular velocity sensor described in the above-described first embodiment. It is observed that there is a tendency that the larger the amount of vibration leakage to the root region of the arm portion, the larger the amount of vibration leakage to the mounting substrate. FIG. 12 is a graph showing a comparison of the amounts of vibration transmitted to the root region of the arm portion in the configurations of the first, the fifth, and the sixth embodiments. It is observed that with respect to the amount of vibration leakage, 50 nm pp in the first embodiment can be reduced to 15 nm pp in the fifth embodiment and to 10 nm pp in the sixth embodiment. It is noted that "pp" in the units means a "peak to peak", and represents a magnitude in vibrational amplitude between a maximum value and a minimum value.

Seventh Embodiment

Figure 13:
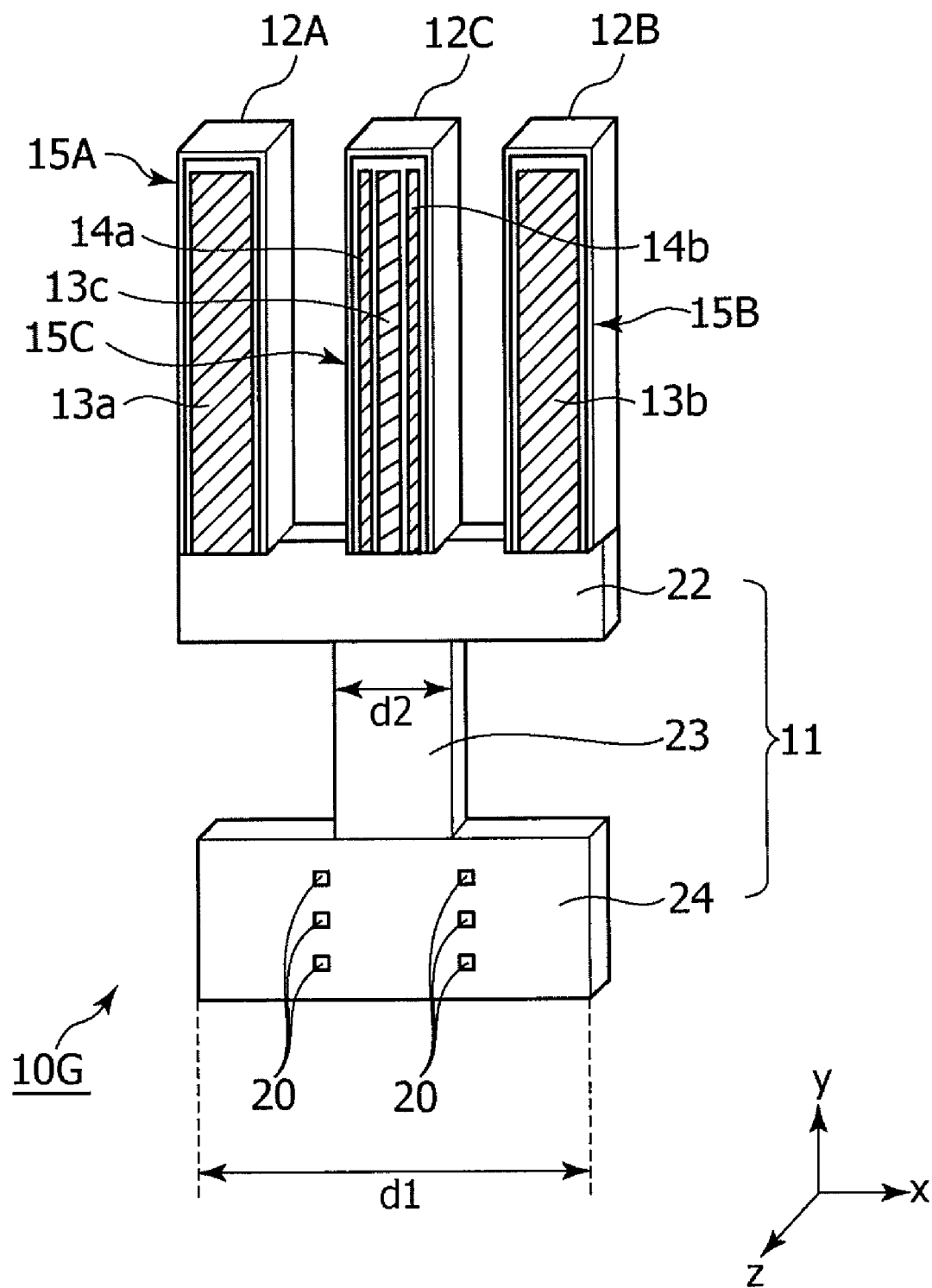
FIG. 13 is a schematic block diagram of an angular velocity sensor according to a seventh embodiment.

FIG. 13 is a schematic block diagram of an angular velocity sensor 10G according to a seventh embodiment. It is noted that in the figure, portions that correspond to those in the above-described first embodiment are designated by like reference numerals to omit its detailed descriptions.

In the angular velocity sensor 10G of this embodiment, a configuration of the base portion 11 that supports the three arm portions 12A to 12C differs from that of the above-described first embodiment. In other words, in this embodiment, the base portion 11 includes: a support portion 22 that supports the three arm portions 12A to 12C; a fixing portion 24 on which formed are a plurality of bumps (external connecting terminals) 20 mounted on the mounting substrate; and a cushioning portion (connection portion) 23 formed between the support portion 22 and the fixing portion 24.

The cushioning portion 23 is configured such that its formation width is smaller than those of the support portion 22 and the fixing portion 24 that correspond to the formation width of the base portion 11. In other words, a width (second width) d2 in the second direction (x axis direction) of the cushioning portion 23 is formed to be smaller than a width (first width) d1 of the support portion 22 or the fixing portion 24. As a result, it may become possible to alleviate the transmission of the vibrations from the support portion 22 that forms the root regions of the arm portions 12A to 12C to the fixing portion 24 that forms a formation area of the bumps 20. This may permit a significant reduction of the amount of vibration leakage to the mounting substrate, allowing improvement of the angular-velocity detection characteristic.

In this embodiment, typically, a thickness (thickness in the z axis direction) of each arm portion 12A to 12C and that of the base portion 11 are substantially the same. However, in this embodiment, even when the thickness of each arm portion 12A to 12C and that of the base portion are not the same, the same result may be obtained as long as the volume of the cushioning portion 23 is designed to be smaller than that of the fixing portion 24. In other words, the widths of the fixing portion 24 and the cushioning portion 23 may not necessarily be specified by d1 and d2.

Figure 14:
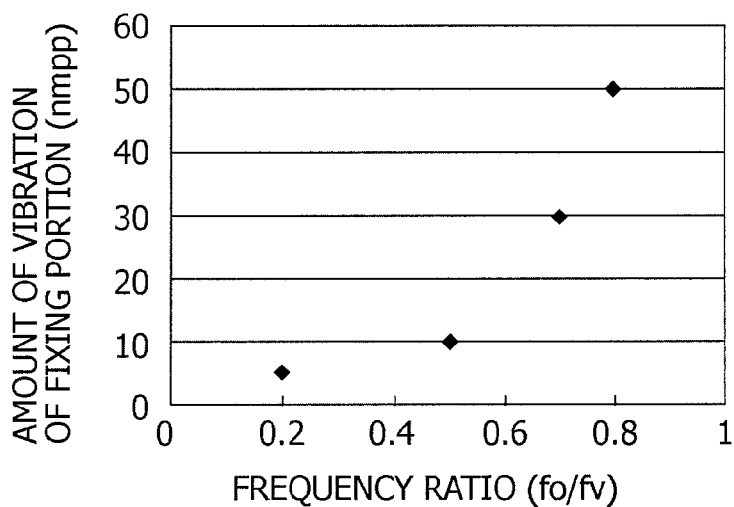
FIG. 14 is a graph showing a relationship between a resonant frequency of a vibration system including the arm portion and an amount of vibration transmitted to a fixing portion.
Figure 15:
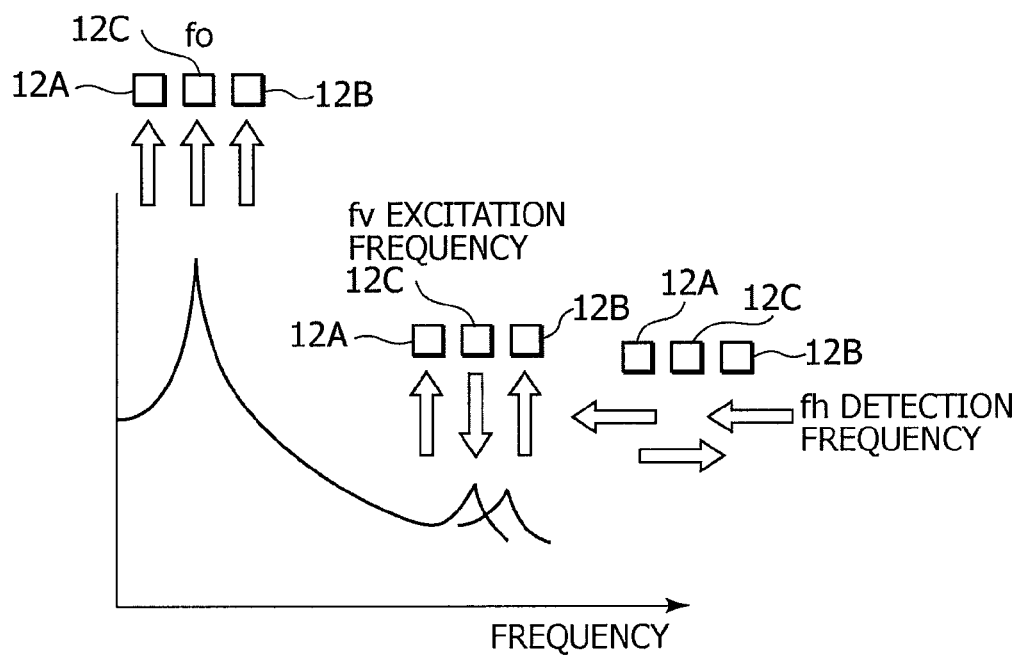
FIG. 15 is a diagram showing one example of a frequency characteristic of the angular velocity sensor of FIG. 13.

Specifically, in the cushioning portion 23, its formation width, formation length, formation thickness, or the like are set such that a resonant frequency f0 of a vibration system including the three arm portions 12A to 12C, the support portion 22, and the cushioning portion 23 is $1/\sqrt{2}$ times or less than vertical resonant frequencies (excitation frequencies) fv of the arm portions 12A to 12C. FIG. 14 shows a relationship between a frequency ratio (f0/fv) and an amount of vibrations transmitted to the fixing portion 24. It is observed that the smaller the frequency ratio (as f0 is lowered relative to fv), the smaller the amount of vibrations transmitted to the fixing portion 24. FIG. 15 shows one example of a frequency characteristic of the angular velocity sensor 10G of this embodiment. The illustrated example shows an example of fv<fh.

A more detailed description is given of f0 and fv of the angular velocity sensor 10G shown in FIG. 13. The angular velocity sensor according to this embodiment, which is a three-tuning-fork type vibrator including three arm portions, has a plurality of vibration systems. Out of the plurality of vibration systems, there are two vibration systems to be noticed as measures against the vibration leakage. Of the two systems, a first vibration system is a vibration system including each arm portion 12A to 12C and the support portion 22. The resonant frequency (first resonant frequency) of this system is the fv. A second vibration system is a vibration system including each arm portion 12A to 12C, the support portion 22, and the cushioning portion 23. The resonant frequency (second resonant frequency) of this system is the f0. The f0 is a resonant frequency of a vibration system in which each arm portion vibrates in the same direction, as shown in FIG. 15.

Thus, the arrangement of the cushioning portion 23 permits inhibiting of the vibration leakage from each arm portion 12A to 12C to the fixing portion 24. Even when a vibration caused by a disturbance which is closer to f0 than fv is applied to the angular velocity sensor, the vibration caused by the disturbance becomes readily absorbable in the second vibration system, allowing a precision output characteristic to be stably obtained.

Figure 21:
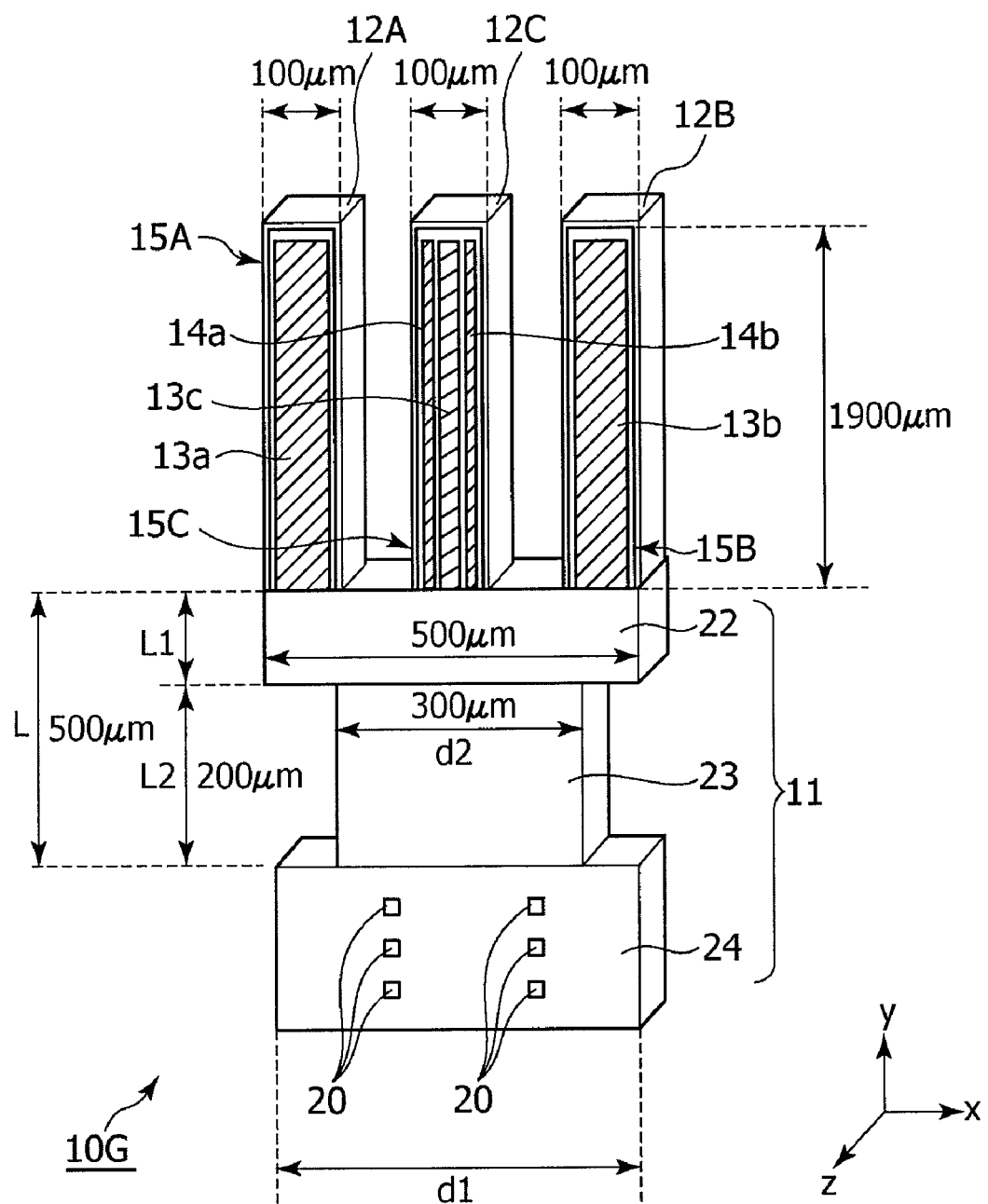
FIG. 21 is a diagram showing typical sizes of the angular velocity sensor 10G shown in FIG. 13.

FIG. 21 shows typical sizes of the angular velocity sensor 10G shown in FIG. 13. In the figure, L (μm) is a length of the support portion 22 and the cushioning portion 23 in the y axis direction. In this case, the size of the fixing portion 24 is not limited, and may appropriately be set.

Figure 22:
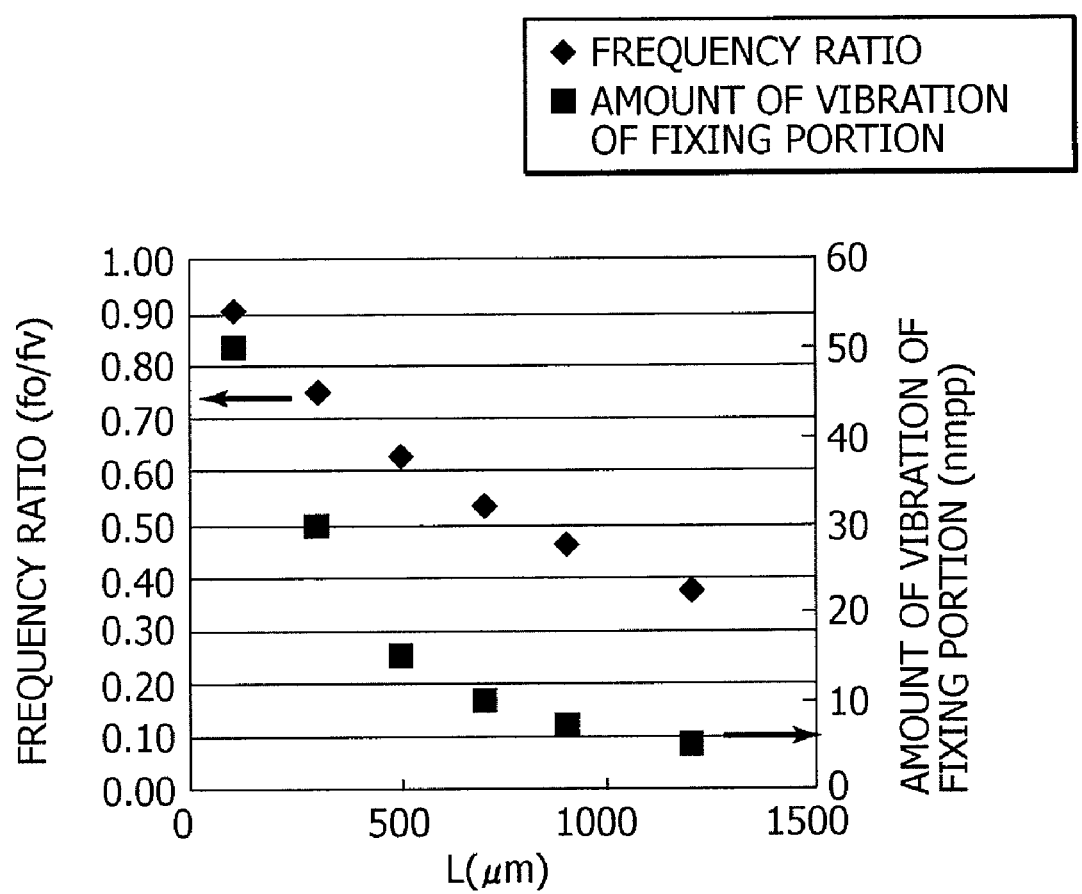
FIG. 22 is a graph showing a relationship between L and a frequency ratio (f0/fv) and that between L and an amount of vibration transmitted to a fixing portion, when the length of each arm portion is 1900 μm.

FIG. 22 is a graph showing a relationship between L and a frequency ratio (f0/fv) and that between L and an amount of vibration transmitted to the fixing portion 24, when the length of each arm portion 12A to 12C is 1900 μm. In this case, although the ratio between a length L1 of the support portion 22 and a length L2 of the cushioning portion 23 is substantially constant, i.e., 5:2, the ratio may not necessarily be constant.

As seen from the graph in FIG. 22, the longer the L, the lower the frequency ratio (f0/fv). Further, the longer the L, the smaller the amount of vibration of the fixing portion 24. When the amount of vibration of the fixing portion 24 exceeds about 30 nm p-p, the vibration is detected as noise by the controller 31A (see FIG. 1), and the detection precision of the angular velocity deteriorates. Therefore, the amount of vibration of the fixing portion 24 preferably is about 30 nm p-p or less.

A frequency ratio (f0/fv) at which the amount of vibration of the fixing portion 24 correspond to a point of 30 nm p-p is about 0.75. Therefore, the frequency ratio (f0/fv) is desired to be smaller than 0.75. Typically, the frequency ratio may be in a range of $0.25 \leq (f0/fv) \leq 1/\sqrt{2}$. When f0/fv is lower than 0.25, it may need to design that the width d2 is small and L2 is long, for example. In this case, the cushioning portion 23 is in a thin shape, and thus, the connection portion may be fractured by an exciting force caused by the vibration of each arm portion 12A to 12C or an impact force from outside applied to the angular velocity sensor. On the other hand, when f0/fv is higher than $1/\sqrt{2}$, the amount of vibration of the fixing portion 24 exceeds 30 nm p-p as described above, and thus, a vibration-leakage prevention function cannot demonstrate its function fully.

Eighth Embodiment

Figure 16:
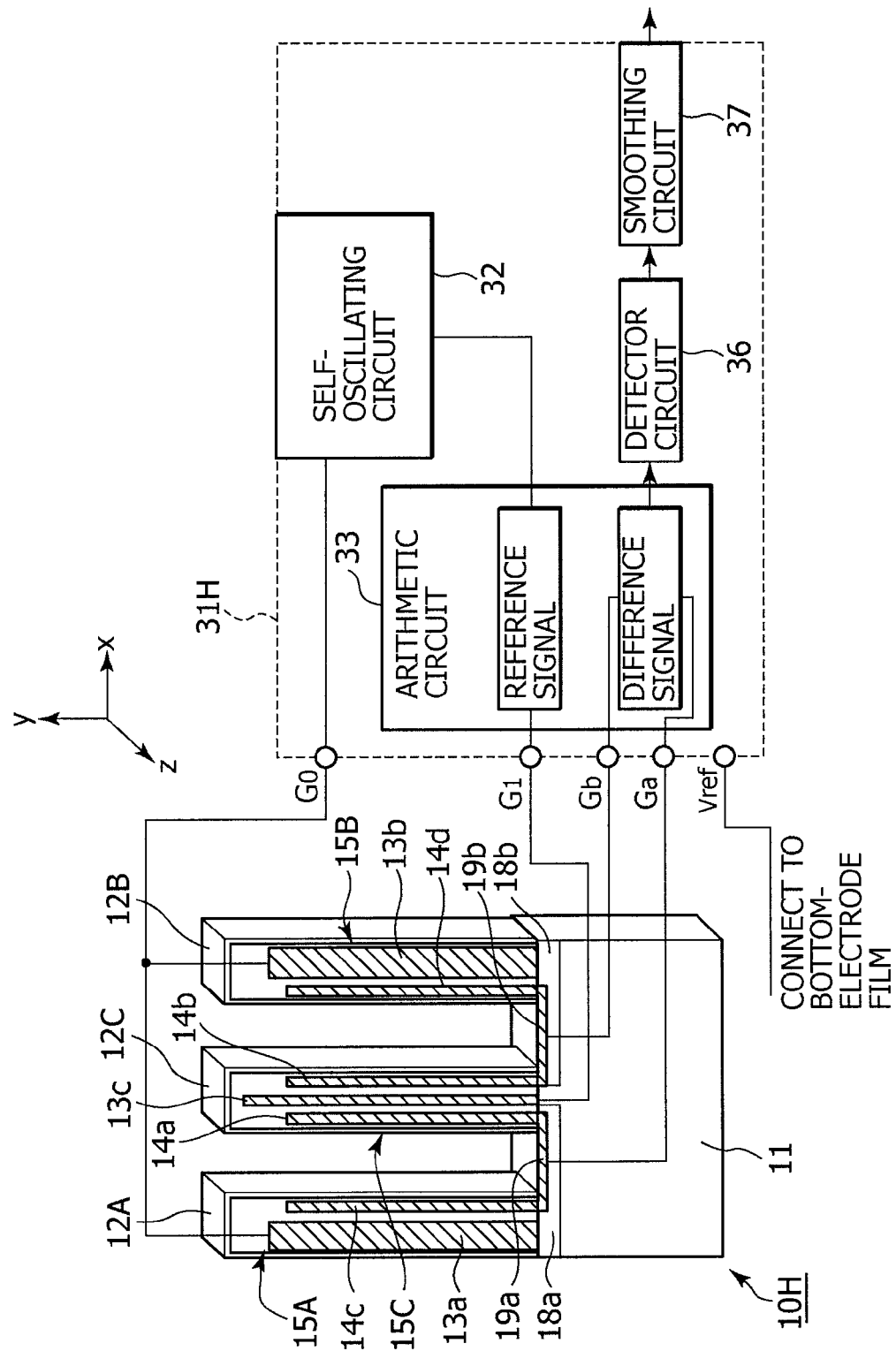
FIG. 16 is a schematic block diagram of an angular velocity sensor according to an eighth embodiment.

FIG. 16 is a schematic block diagram of an angular velocity sensor 10H according to an eighth embodiment. It is noted that in the figure, portions that correspond to those in the above-described first embodiment are designated by like reference numerals to omit its detailed descriptions.

The angular velocity sensor 10H of this embodiment differs from that of the above-described first embodiment in that a pair of detection electrodes 14a and 14b on the center arm portion 12C are each continuously formed in an approximately U shape by extending via the base portion 11 from the center arm portion 12C to the outer arm portion 12A on one side and extending in the similar manner to the outer arm portion 12B on the other side.

As shown in FIG. 16, out of the pair of detection electrodes 14a and 14b formed on the center arm portion 12C, the detection electrode 14a on one side (left side in the figure) is connected via a relay electrode 19a (first relay electrode) formed on a root region of the arm portion of the base portion 11 to the detection electrode 14c (third detection electrode) on the outer arm portion 12A positioned on the one side. The detection electrode 14b on the other side (right side in the figure) is connected via a relay electrode 19b (second relay electrode) formed on the root region of the arm portion of the base portion 11 to the detection electrode 14d (fourth detection electrode) on the outer arm portion 12B positioned on the other side. The detection electrode 14c is adjacent to the drive electrode 13a, and positioned closer to a side of the center arm portion 12C than the axis of the outer arm portion 12A, and the detection electrode 14d is adjacent to the drive electrode 13b, and positioned closer to the side of the center arm portion 12C than the axis of the outer arm portion 12B.

The relay electrodes 19a and 19b are each formed in the root regions of the arm portions of the base portion 11, i.e., on piezoelectric films 18a and 18b, which are formed between the center arm portion 12C and the outer arm portion 12A and between the center arm portion 12C and the outer arm portion 12B, respectively. The piezoelectric films 18a and 18b are formed at the same time as a formation process of the piezoelectric films 16a to 16c that form the piezoelectric functional layers 15A to 15C on the respective arm portions 12A to 12C and formed by using the same material as those of the piezoelectric films 16a to 16c. The formation of the piezoelectric films 18a and 18b are optional, and may be omitted.

The relay electrodes 19a and 19b are connected to the Ga terminal and the Gb terminal of a controller 31H, respectively. In the arithmetic circuit 33, a difference of the detection signals of the relay electrodes 19a and 19b is calculated to be used as the angular velocity signal. Hereinafter, with reference to FIGS. 17A and 17B, an operation of the angular velocity sensor 10H is described.

Figure 17A:
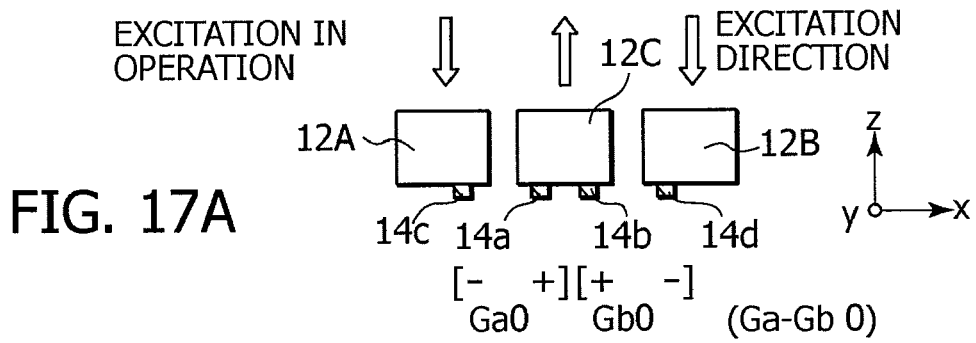
FIG. 17 shows frontal views of relevant parts of arm portions, for describing an operation of the angular velocity sensor of FIG. 16.

FIG. 17A is a frontal view of relevant parts of the arm portions 12A to 12C under excitation, and shows a state in which the outer arm portions 12A and 12B vibrate downwardly with respect to the figure and the center arm portion 12C vibrates upwardly with respect to the figure at an arbitrary moment. When no angular velocity is applied, since the arm portions vibrate in opposite phase to each other in the detection electrodes 14a and 14b on the center arm portion 12C and the detection electrodes 14c and 14d on the outer arm portions 12A and 12B, signals of symbols different from each other are generated. However, the detection electrodes 14a and 14c and the detection electrodes 14b and 14d are electrically connected with each other, and thus, the generated signals are cancelled by each other. Therefore, a difference signal (Ga−Gb) of the generated signals is also rendered zero, and as a result, no angular velocity signal is generated.

Figure 17B:
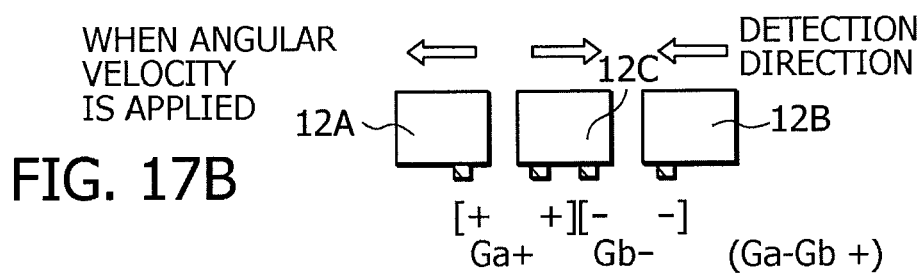

On the other hand, in the state of FIG. 17A, when the angular velocity is applied around the axes of the arm portions 12A to 12C, a vibration in a horizontal direction is induced in each arm portion 12A to 12C, as shown in FIG. 17B, for example. In this case, the two outer arm portions 12A and 12B vibrate in phase, and the center arm portion 12C vibrates in opposite phase with the outer arm portions 12A and 12B. In a state of FIG. 17B, corresponding to the magnitude of the input angular velocity, the detection electrodes 14a and 14b on the center arm portion 12C generate signals opposite in phase with each other, and the difference signal thereof is processed as the angular velocity signal. At this time, the detection electrode 14c of the outer arm portion 12A generates a signal in phase with the detection electrode 14a, and the detection electrode 14d of the outer arm portion 12B generates a signal in phase with the detection signal 14b.

Figure 17C:
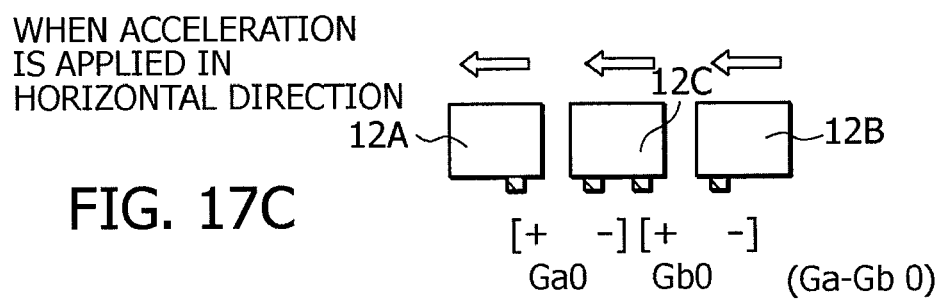
Figure 18:
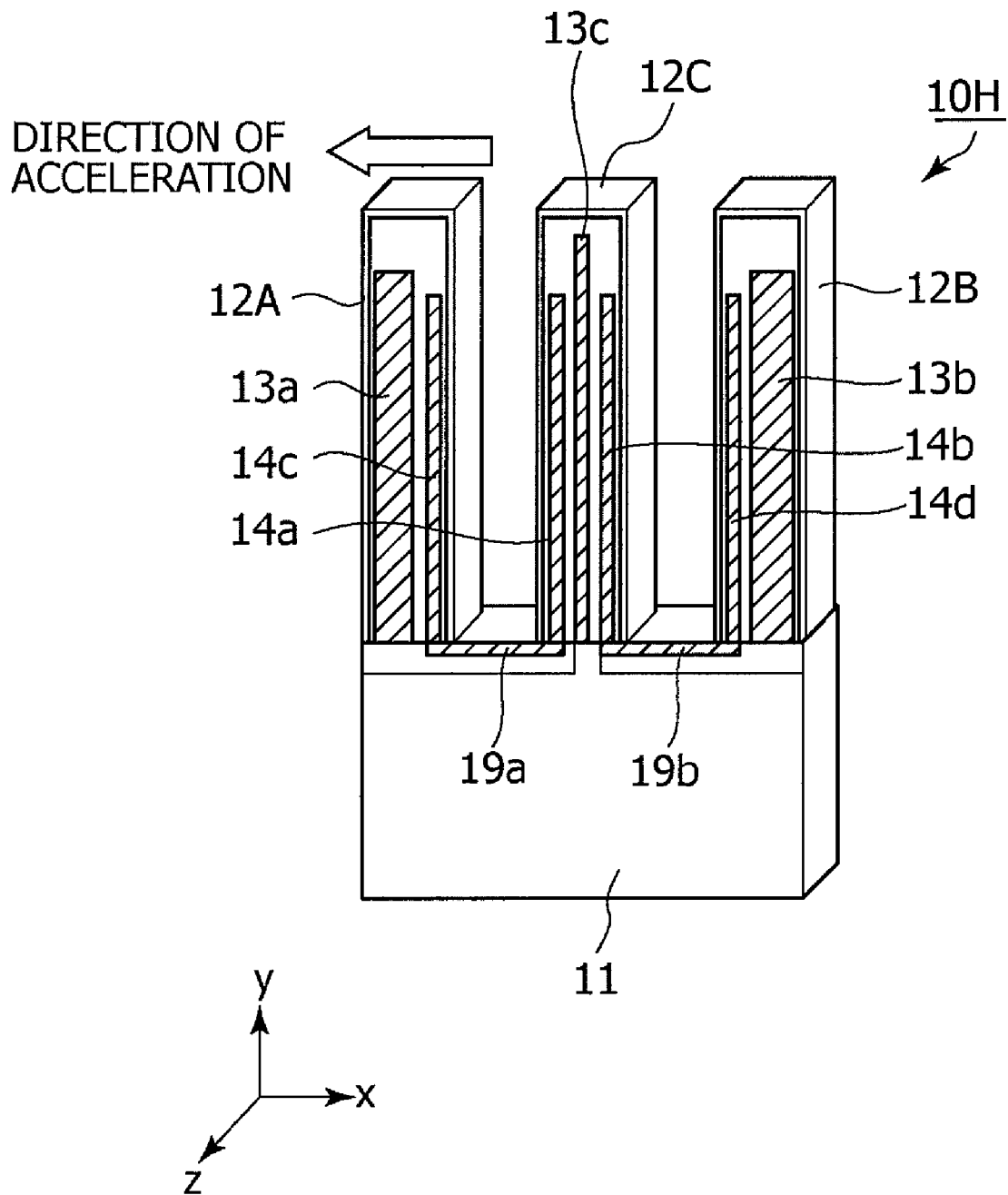
FIG. 18 is a diagram for describing a direction of acceleration applied to the angular velocity sensor of FIG. 16.
Figure 19:
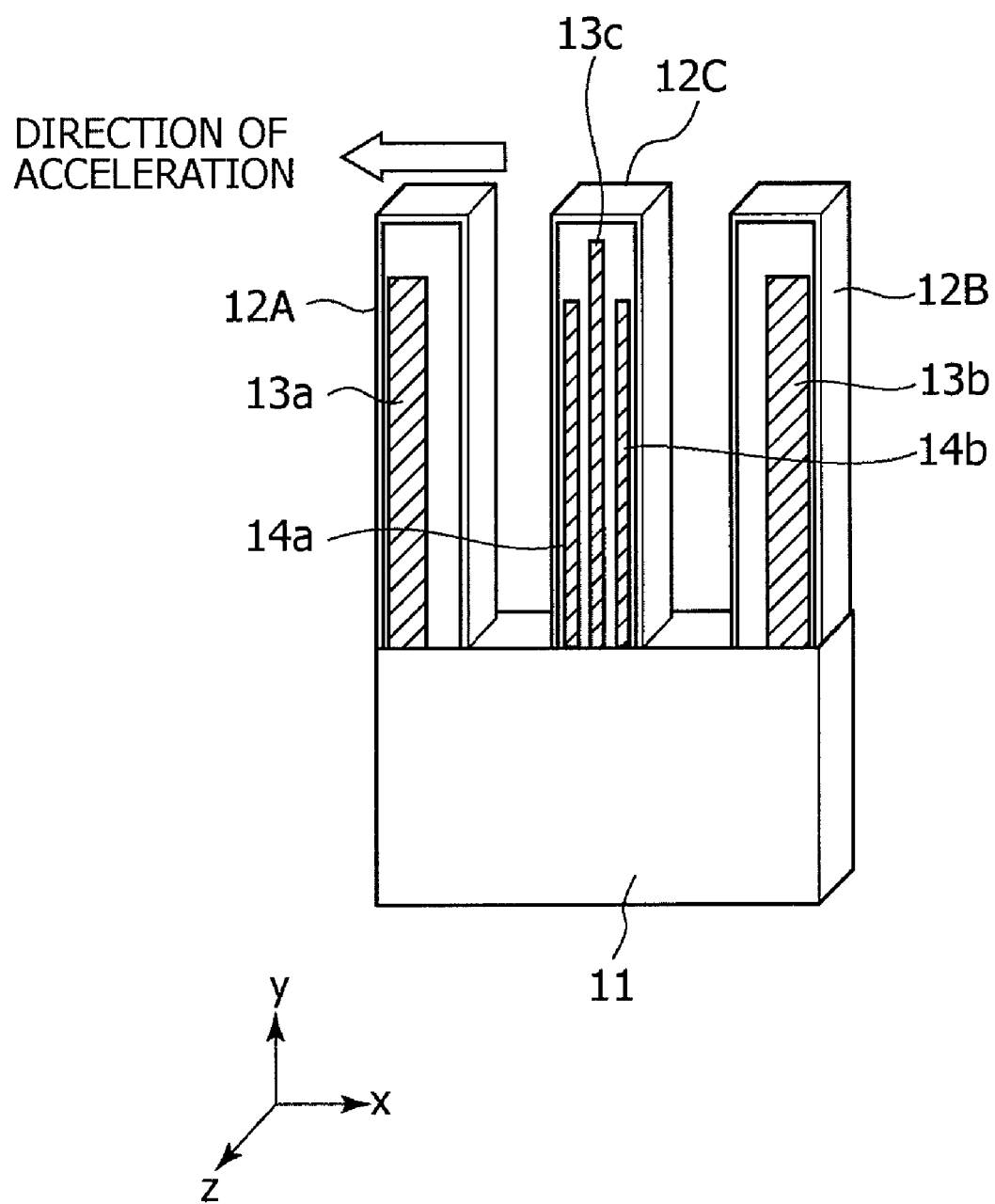
FIG. 19 is a schematic block diagram of another angular velocity sensor that is described as a comparative example of the angular velocity sensor of FIG. 16.

Subsequently, a case where acceleration is applied in an aligning direction (x axis direction) of the arm portions 12A to 12C in the angular velocity sensor 10H is now considered, as shown in FIG. 18. In this case, as shown in FIG. 17C, when the acceleration is applied in the left direction in the figure, inertia force is simultaneously acted in the left direction to each arm portion 12A to 12C, and thus, in the detection electrode 14a and the detection electrode 14b, signals opposite in phase with each other (different symbols) are generated. Therefore, as shown in FIG. 19, for example, when the detection electrode is arranged only in the center arm portion 12C, the difference signal of the detection electrodes 14a and 14b is superposed on sensor output to be processed as the angular velocity signal. In other words, there occurs a failure in that although no angular velocity occurs, the angular velocity signal is generated.

In contrary, in the angular velocity sensor 10H of this embodiment, the detection electrodes 14c and 14d electrically connected to the detection electrodes 14a and 14b are formed on the outer arm portions 12A and 12B, respectively. Thus, as shown in FIG. 17C, the signals that correspond to the acceleration acted on the outer arm portions 12A and 12B are respectively generated on the detection electrodes 14c and 14d on each of the arm portions, and each signal is cancelled by each other because the signals are of the same magnitude as and in opposite phase with the signals generated in the detection electrodes 14a and 14b. As a result, detection signals Ga and Gb are rendered zero. Thereby, the difference signal of the detection signals is also rendered zero, which prevents superposing of the signals generated by the acceleration on the sensor output. When the acceleration is applied in the left direction of the figure, the same effect may also be obtained.

Figure 17D:
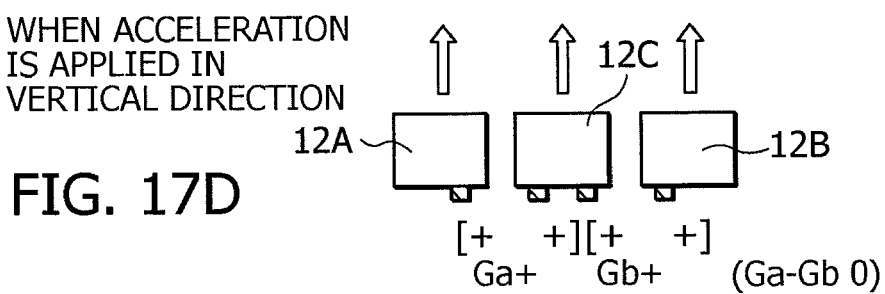

On the other hand, a case where the acceleration is applied in an excitation direction (z axis direction) of the arm portions 12A to 12C in the angular velocity sensor 10H is now considered. As shown in FIG. 17D, for example, when the acceleration is applied in an upward direction in the figure, inertia force is simultaneously acted in the upward direction to each arm portion 12A to 12C, and as a result, a signal in phase and of the same magnitude is generated in each detection electrode 14a to 14d. However, the difference signal of the detection signals is rendered zero, and thus, the sensor output is not influenced. This holds true of a configuration of the angular velocity sensor shown in FIG. 19. It is noted that the same is true of a case where the acceleration is applied in a downward direction of the figure.

Figure 20:
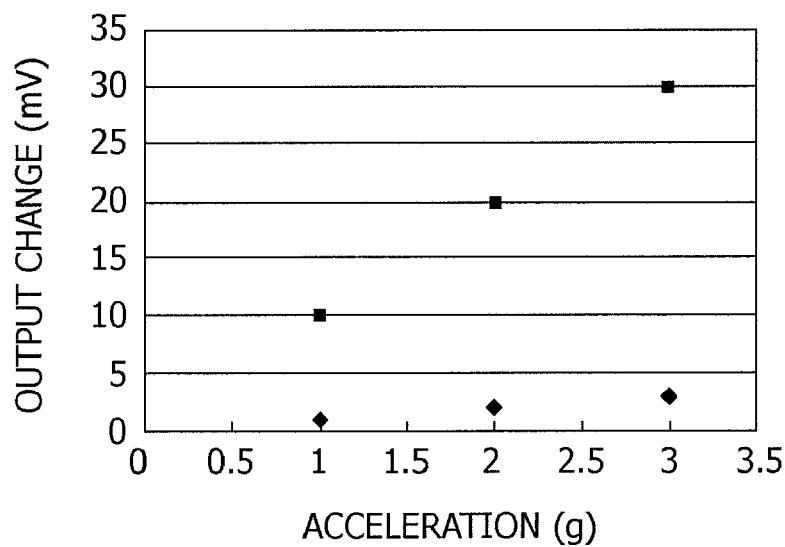
FIG. 20 is a graph showing a comparison between an output characteristic when acceleration is applied in the angular velocity sensor of FIG. 18 and that in FIG. 19.

As described above, according to the angular velocity sensor 10H of this embodiment, it may become possible to stably perform a precision angular-velocity detection by eliminating the influence by the acceleration. FIG. 20 shows one example of a change in sensor output in the angular velocity sensors shown in FIGS. 18 and 19 when the acceleration is applied in the x axis direction as shown in the respective figures. The units of the acceleration on the horizontal axis are g (=9.8 m/s$^2$). As is evident from the results of FIG. 20, the angular velocity sensor 10H of this embodiment shown in FIG. 18 has less influence by the acceleration, and provides a more stable output characteristic.

Ninth Embodiment

Figure 23:
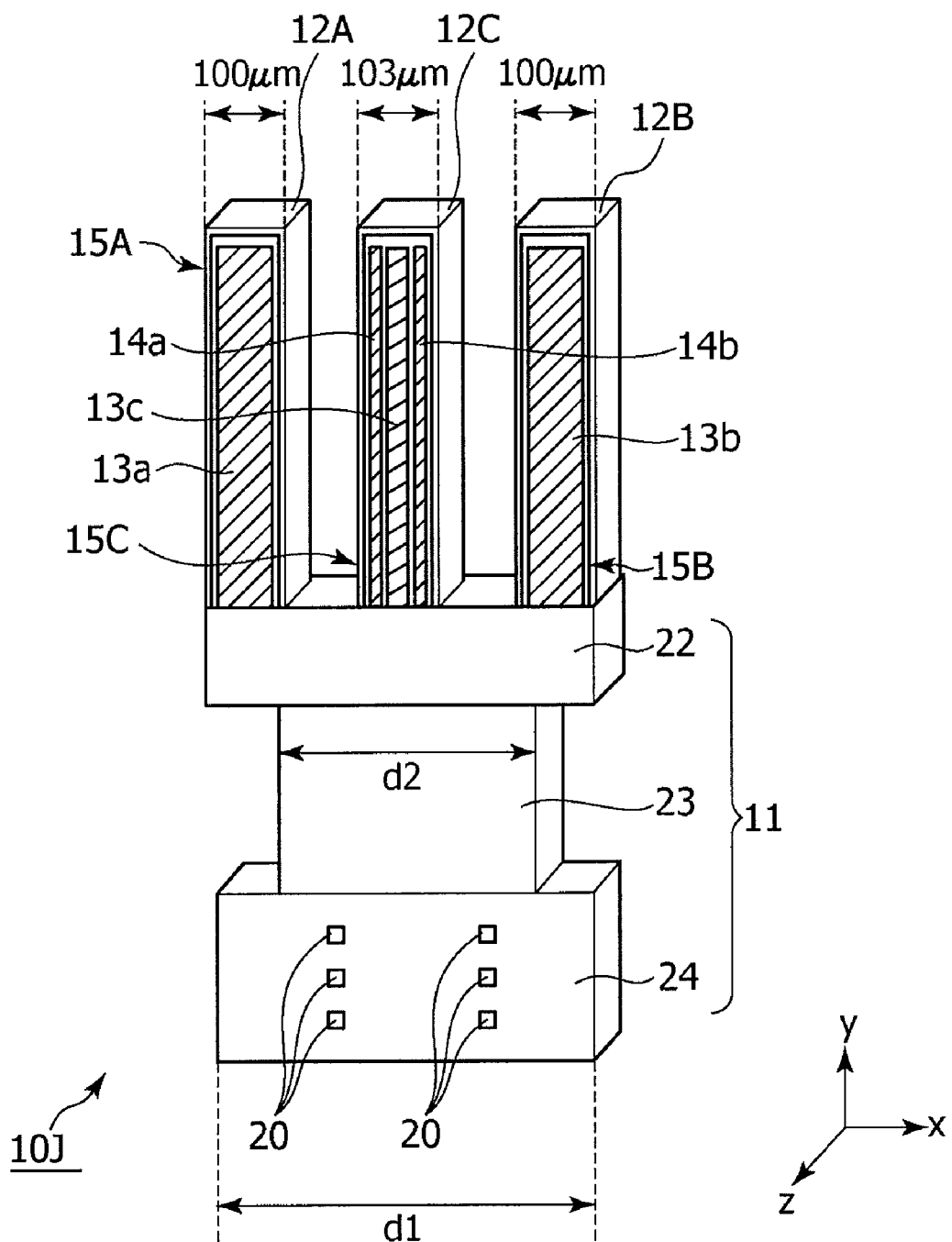
FIG. 23 is a diagram showing dimensions of an angular velocity sensor according to a ninth embodiment.

FIG. 23 is a diagram showing sizes of an angular velocity sensor according to a ninth embodiment. Similar to the angular velocity sensors shown in FIGS. 14 and 21, an angular velocity sensor 10J of this embodiment is of a type which is provided with the cushioning portion 23.

The outer arm portions 12A and 12B of the angular velocity sensor 10J have the resonant frequency fv (first resonant frequency) in the excitation direction. The center arm portion 12C has a third vibration system (resonant frequency fc (second resonant frequency)) that is neither a vibration system in the excitation direction nor a vibration system in a width direction.

A difference between fv and fc is set between 1 kHz and 2 kHz. To achieve this value, typically, the width of the center arm portion 12C is set 103 μm, and the widths of the outer arm portions 12A and 12B are 100 μm. In this case, a thickness of each arm portion 12A to 12C substantially is the same. Alternatively, it may be possible that the thickness of the center arm portion 12C is 103 μm, and those of the outer arm portions 12A and 12B are 100 μm.

Alternatively, the width (or thickness) of the center arm portion 12C may be formed to be smaller than the widths (or thicknesses) of the outer arm portions 12A and 12B.

When a difference between fv and fc, i.e., |fv−fc|, is lower than 1 kHz, a vibration of the third arm portion by the resonant frequency fc results in being noise. As a result, the detection precision of the angular velocity deteriorates. When |fv−fc| is higher than 2 kHz, the shape, the size, or the like, of the center arm portion 12C deviate from a predetermined appropriate range. As a result, a balance of the resonant frequencies (fv, fh) in the excitation direction and the width direction of the center arm portion 12C deteriorates, thereby leading to deterioration of a temperature characteristic of the angular velocity sensor.

Figure 24:
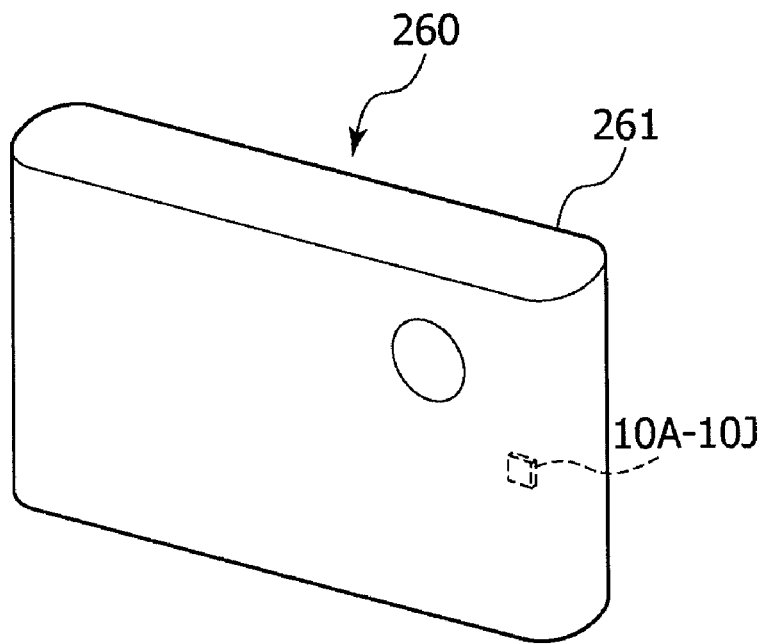
FIG. 24 is a schematic perspective view showing a digital camera as an example of an electronic device on which the angular velocity sensor is mounted.
Figure 25:
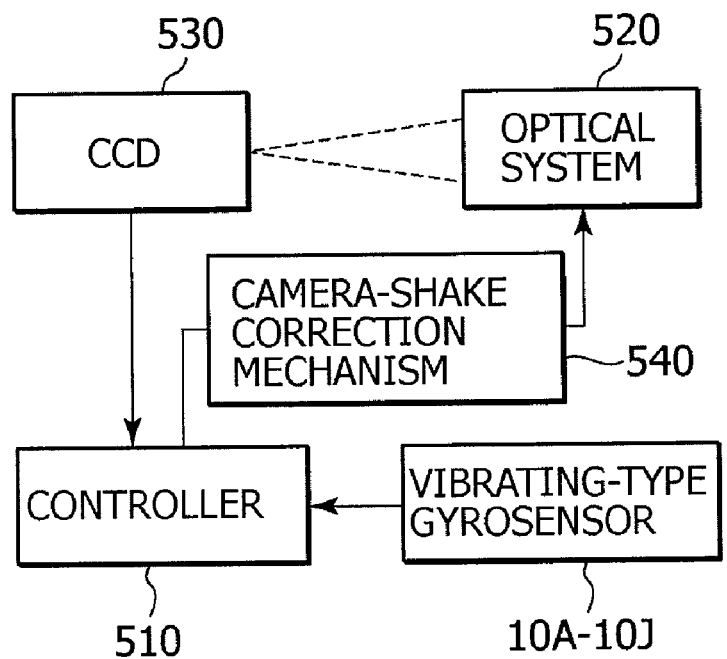
FIG. 25 is a block diagram showing a configuration of the digital camera.

FIG. 24 is a schematic perspective view showing a digital camera, as an example of an electronic device on which the angular velocity sensors 10A to 10J according to the above-described embodiments are mounted. FIG. 25 is a block diagram showing a configuration of the digital camera.

A digital camera 260 includes a device main body 261 on which the angular velocity sensors 10A to 10J are mounted. The device main body 261 is a frame or a housing made of metal, resin, or the like, for example. In reality, the angular velocity sensors 10A to 10J are configured to be packaged in about four millimeters square in size, for example. A packaged gyro-device mounts at least two angular velocity sensors 10A to 10J to detect rotational angular velocities around at least two axes.

As shown in FIG. 25, the digital camera 260 includes the angular velocity sensors 10A to 10J, a controller 510, an optical system 520 provided with a lens or the like, a CCD 530, a camera-shake correction mechanism 540 that performs a camera shake correction on the optical system 520.

Biaxial Coriolis force is detected by the angular velocity sensors 10A to 10J. Based on the detected Coriolis force, the controller 510 uses the camera-shake correction mechanism 540 to perform the camera shake correction with the optical system 520.

The electronic device on which the angular velocity sensors 10A to 10J are mounted is not limited to the above-describe digital camera. Other electronic devices include, for example, a laptop computer, a PDA (Personal Digital Assistance), an electronic dictionary, an audio/visual device, a projector, a mobile telephone, a game device, a car navigation device, a robot device, and other electronic products.

Figure 26:
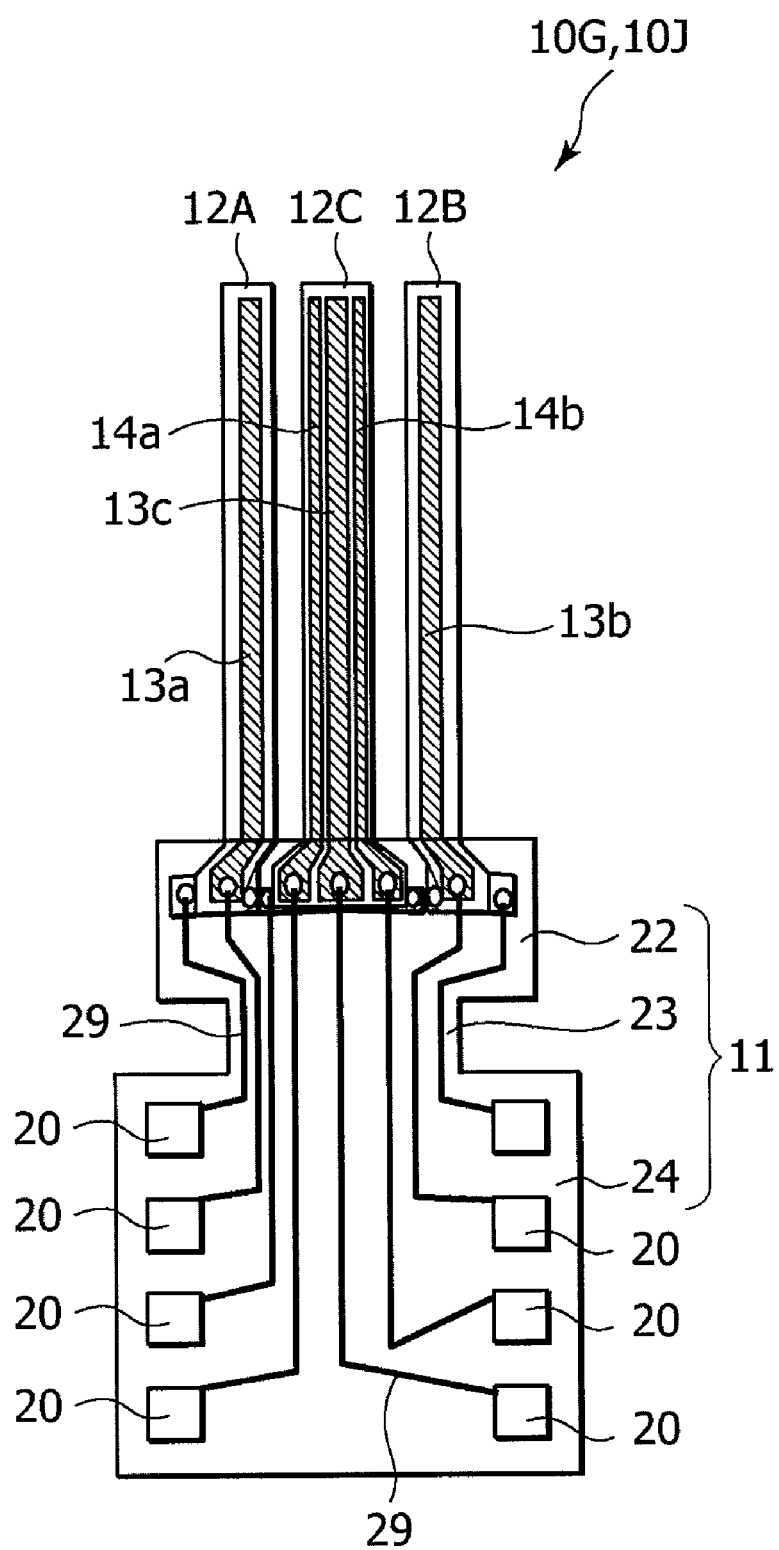
FIG. 26 is a plain view showing a practical example of the angular velocity sensor shown in FIG. 21 or in FIG. 23.

FIG. 26 is a plain view showing a typical example of the angular velocity sensor 10G shown in FIG. 21 or the angular velocity sensor 10J shown in FIG. 23 in practice. In this angular velocity sensor, the external connecting terminals 20 are positioned outwardly of the outer arm portions 12A and 12B. The drive electrodes 13a and 13b, the detection electrodes 14a and 14b, and the reference electrode 13c are connected via the lead wirings 29 to the respective external connecting terminals 20.

Tenth Embodiment

Figure 27:
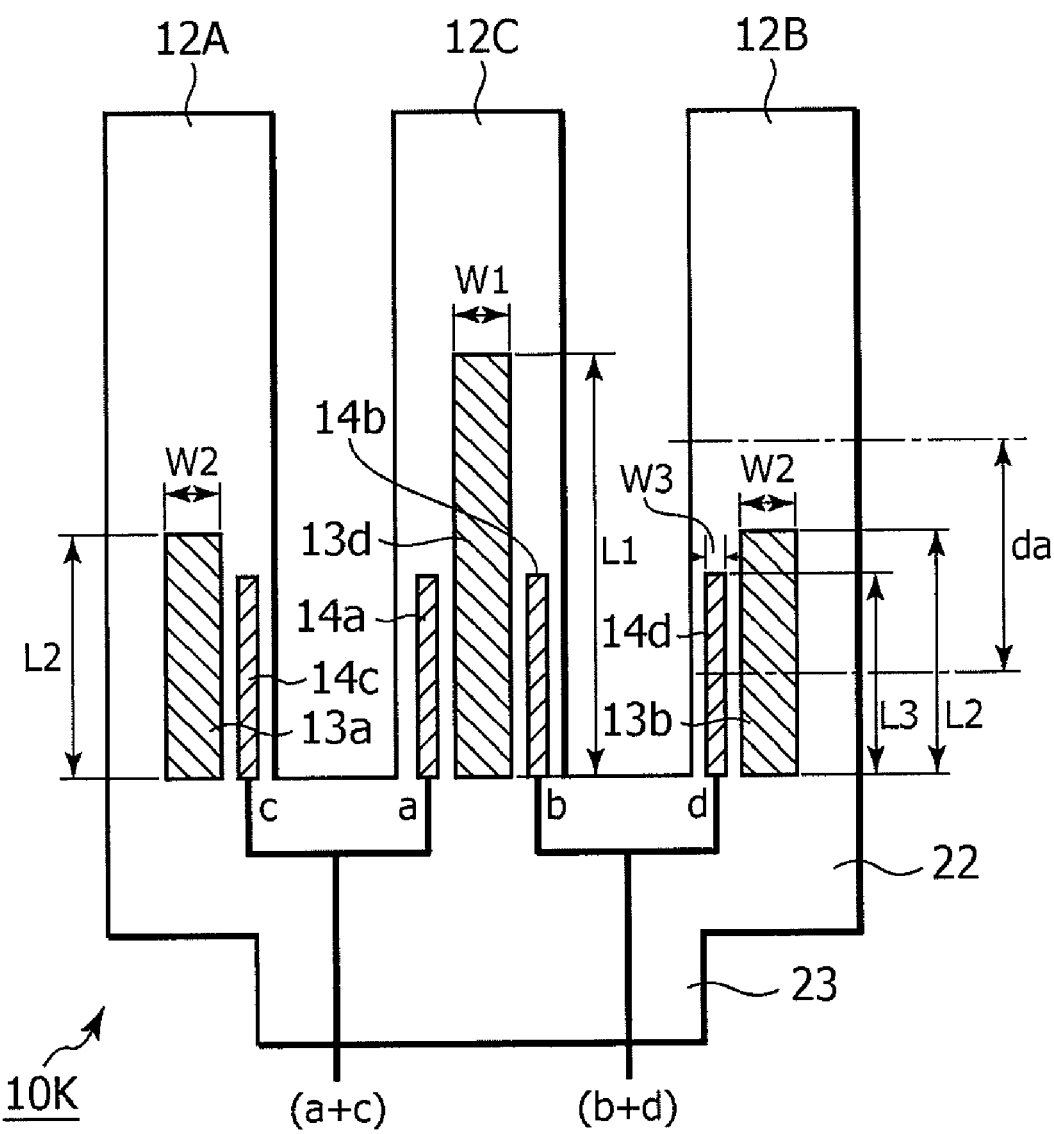
FIG. 27 is a schematic block diagram of an angular velocity sensor according to a tenth embodiment.

FIG. 27 is a view schematically showing an angular velocity sensor according to Tenth Embodiment. Like numerals are used to indicate like elements of the angular velocity sensor 10H described in Eighth Embodiment, and redundant explanations thereof are omitted.

As shown in the figure, in a similar way as in the angular velocity sensor 10H described in the Eighth Embodiment described above, in the angular velocity sensor 10K according to the present embodiment, the detection electrode 14a disposed on the center arm portion 12C is connected to the detection electrode 14c disposed on the outer arm portion 12A on the left hand side in the figure. Furthermore, the detection electrode 14b disposed on the center arm portion 12c is connected to the detection electrode 14d disposed on the outer arm portion 12B on the right hand side in the figure. The angular velocity sensor 10K of the present embodiment and the angular velocity sensor 10H of the Eighth Embodiment are different in that, in the present embodiment, the drive electrode 13d (third drive electrode) is formed on the center arm portion 12C to replace the reference electrode 13c.

In a similar way as in the angular velocity sensor 10H shown in FIG. 16, the connection between the detection electrodes 14a and 14c, and the connection between the detection electrodes 14b and 14d may be realized via relay electrodes, respectively, or via lead wire without using the relay electrodes. All of the detection electrodes 14a to 14 have the same width W3 and the length L3. Furthermore, the distances da, which are distances from the centers of respective arm portions to the corresponding detection electrodes in the longer length direction, for all of the detection electrodes 14a to 14d are the same.

In the present embodiment, a controller 31K (not shown in the figure) detects, as the angular velocity signal, a differential signal (a+c)−(b+d), which is difference between a sum signal a+c (first sum signal) and a sum signal b+d (second sum signal), where a, b, c, d denote detection values of the detection electrodes 14a, 14b disposed on left and right hand side of the center arm portion 12C, and detection electrodes 14c, 14d disposed on the outer arm portions 12A, 12B, respectively. In a similar way as in the drive electrodes 13a and 13b, the drive signal generated in the self-oscillating circuit 32 of the controller 32K is inputted to the drive electrode 13d. Alternatively, the controller 31K may, for example, feedback a sum signal (a+c)+(b+d), which is the sum of the sum signal (a+c) and the sum signal of (b+d), to the self-oscillating circuit 32 as an reference signal.

Figure 28A:
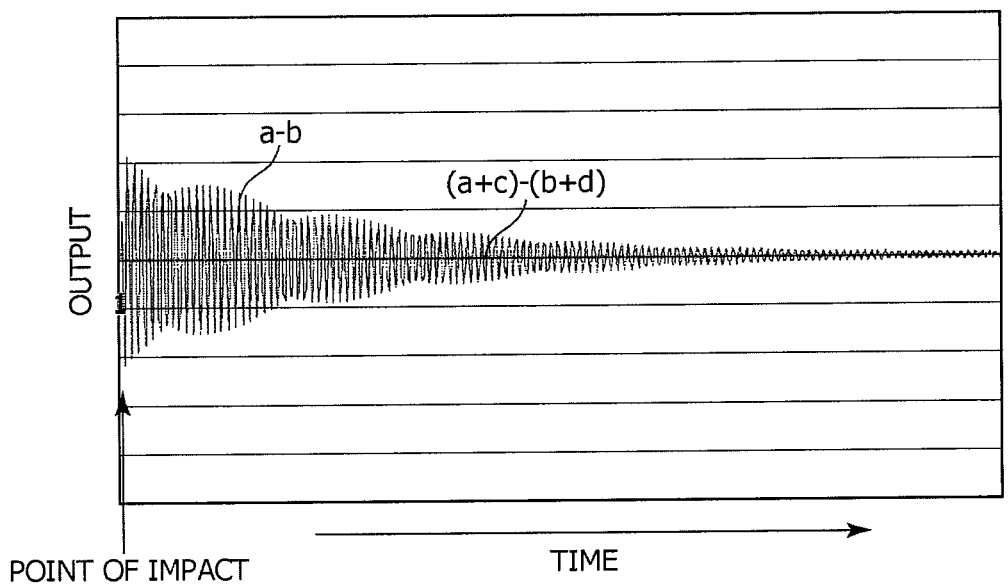
FIG. 28 is a graph showing outputs of the angular velocity sensor according to the tenth embodiment and an angular velocity sensor that detects a-b as the angular velocity signal when acceleration is applied on the angular velocity sensors, respectively.
Figure 28B:
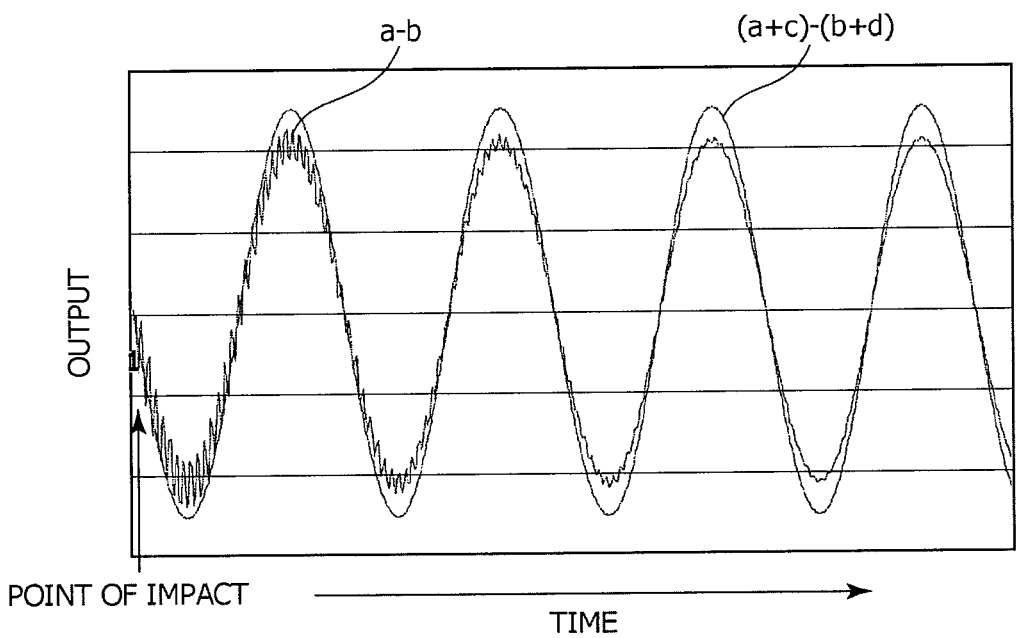

FIGS. 28A and 28B are graphs showing output results of the angular velocity sensor 10K according to the present embodiment and an angular velocity sensor that detects "a−b" as the angular velocity signal when an impact (acceleration) is applied thereon, respectively. FIG. 28A shows the result when no Coriolis force is applied. FIG. 28B shows the result when Coriolis force is applied.

As shown in the figure, when the acceleration such as impacts is applied thereon, damping noise is generated if the differential signal of "a" and "b" is detected. However, in the present embodiment, noise due to such an acceleration may be suppressed by detecting the differential signal of (a+c)−(b+d), because of a similar reason described in the above-described Eighth Embodiment.

Furthermore, as shown in FIG. 28B even when Coriolis force is applied, generation of noise due to impacts may be avoided, and outputs of detection values from the outer arm portions 12A and 12B increase. In other words, an output corresponding to Coriolis force becomes higher, thereby improving detection efficiency of the angular velocity.

In the angular velocity sensor 10K according to the present embodiment, the width W1 of the drive electrode 13d disposed on the center arm portion 12C and the width W2 of the drive electrodes 13a and 13b of the outer arm portions 12A and 12B are same. Furthermore, the length L1 of the drive electrode 13d is twice of the length L2 of the drive electrodes 13a and 13b. In the present embodiment, S1:S2(=S3)=2:1 is satisfied, where S1 denotes a substantial drive area of the drive electrode 13d disposed on the center arm portion 13C, and S2, S3 denote substantial drive areas of the drive electrode 13a disposed on the outer arm portion 12A and the drive electrode 13b disposed on the outer arm portion 12B, respectively.

Accordingly, the oscillating width of each drive amount of the outer arm portions 12A and 12B is one half of that of the drive amount of the center arm portion 12C, thereby canceling momentums of motions generated by driving of the arm portions. Accordingly, vibrations transmitted to the root region of the arm portions 12A to 12C may be canceled by balancing forces, thereby allowing substantial reduction of vibration leakage to the base portion 22 and the mounting substrate.

Alternatively, in the angular velocity sensor 10k according to the present embodiment, instead of connecting the detection electrodes 14a and 14c and the detection electrodes 14b and 14d, the controller 31K may input individual signals of "a", "b", "c" and "d", in a similar way as in the angular velocity sensor 10C (FIG. 6) described in Third Embodiment. In such a construction, it is also possible to avoid generation of noise due to the acceleration by detecting the differential signal (a+c)−(b+d) as the angular velocity signal, based on inputted signals of "a", "b", "c" and "d". Here, it is desirable to generate the drive signal by only sending the signal of a+b as the feedback to the self-oscillating circuit 32, instead of the sum signal of a+c and b+d. When the sum signals of "a", "b", "c" and "d" are used for feedback, "a" and "c", "b" and "d" are in reverse phase. Furthermore, when the phase is shifted due to presence of Coriolis force, ratios of change in the signals of a+c and b+d increase, and amounts of vibration in each arm portions become easier to change. Accordingly, the operation of each arm portion becomes unstable when Coriolis force is present. If the operation of each arm portion cannot be stabilized, errors may be occurred in detecting the angular velocity because of changes in the vibration amount of each arm portion. As a result, signal linearity in the angular velocity detection with respect to Coriolis force may be lowered, thereby reducing a dynamic range of signal detection. In the present embodiment, only the signal of a+c is used as the feedback, thereby reducing an amount of change caused by Coriolis force in the feedback signal when Coriolis force is present and realizing stable drive state.

Eleventh Embodiment

Figure 29:
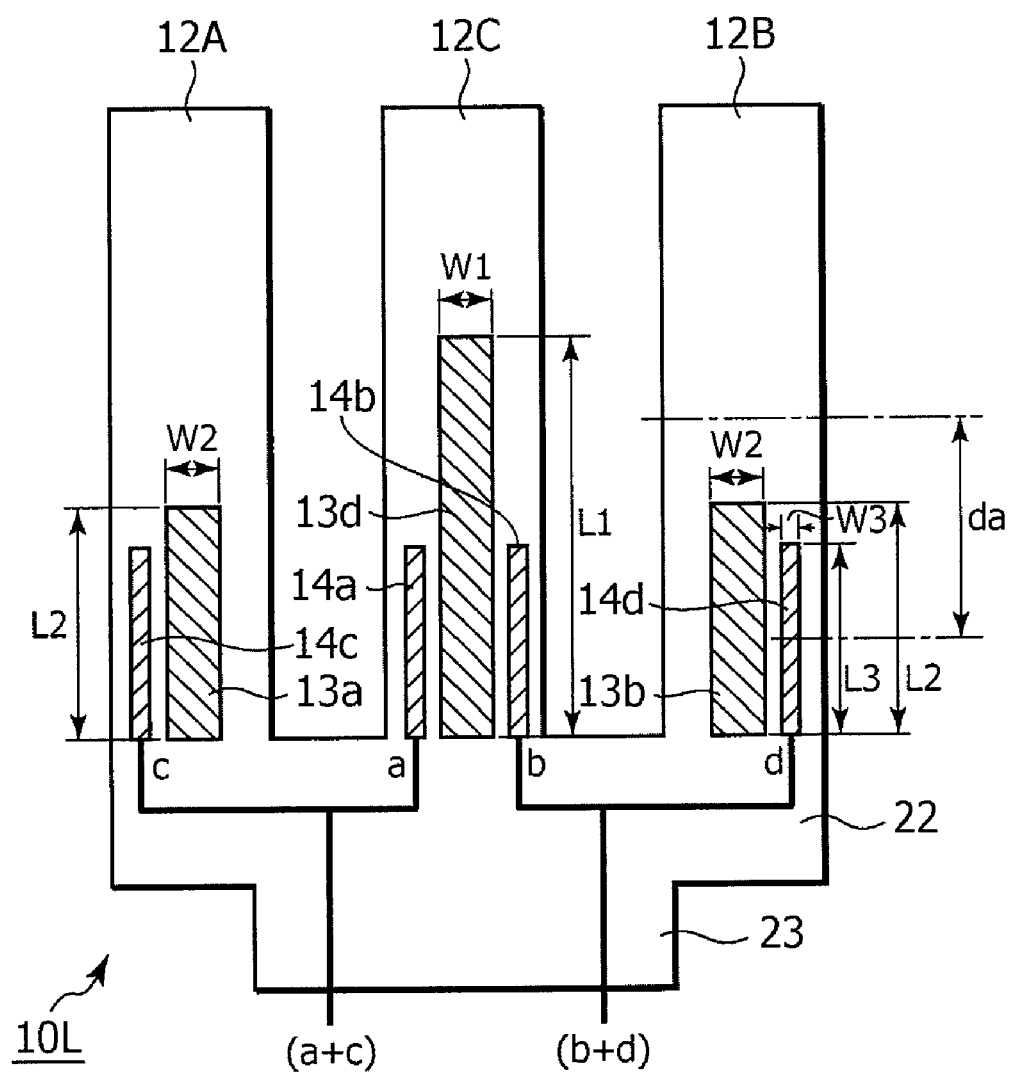
FIG. 29 is a schematic block diagram of an angular velocity sensor according to a eleventh embodiment.

FIG. 29 is a schematic view of an angular velocity sensor according to Eleventh Embodiment. In the figure, like numerals are used for like elements and functions in the angular velocity sensor 10K described in the tenth embodiment (FIG. 28), and redundant descriptions of thereof are omitted.

As shown in the figure, in the angular velocity sensor 10L according to the present embodiment, positions of the detection electrodes 14a ad 14b on the outer arm portions 12A and 12B are different from those in the angular velocity sensor 10K according to Tenth Embodiment described above. In other words, in Tenth Embodiment, the detection electrodes 14a and 14b on the outer arm portions 12A and 12B are disposed on sides facing the center arm portion 12C, respectively. Instead, in the angular velocity sensor 10L according to the present embodiment, the detection electrodes 14a and 14b on the outer arm portions 12A and 12C are disposed on sides facing the opposite to the center arm portion 12C. Even with such a construction, generation of noise due to accelerations may be avoided in a similar way as in Third, Eighth and Tenth Embodiments.

Twelfth Embodiment

Figure 30:
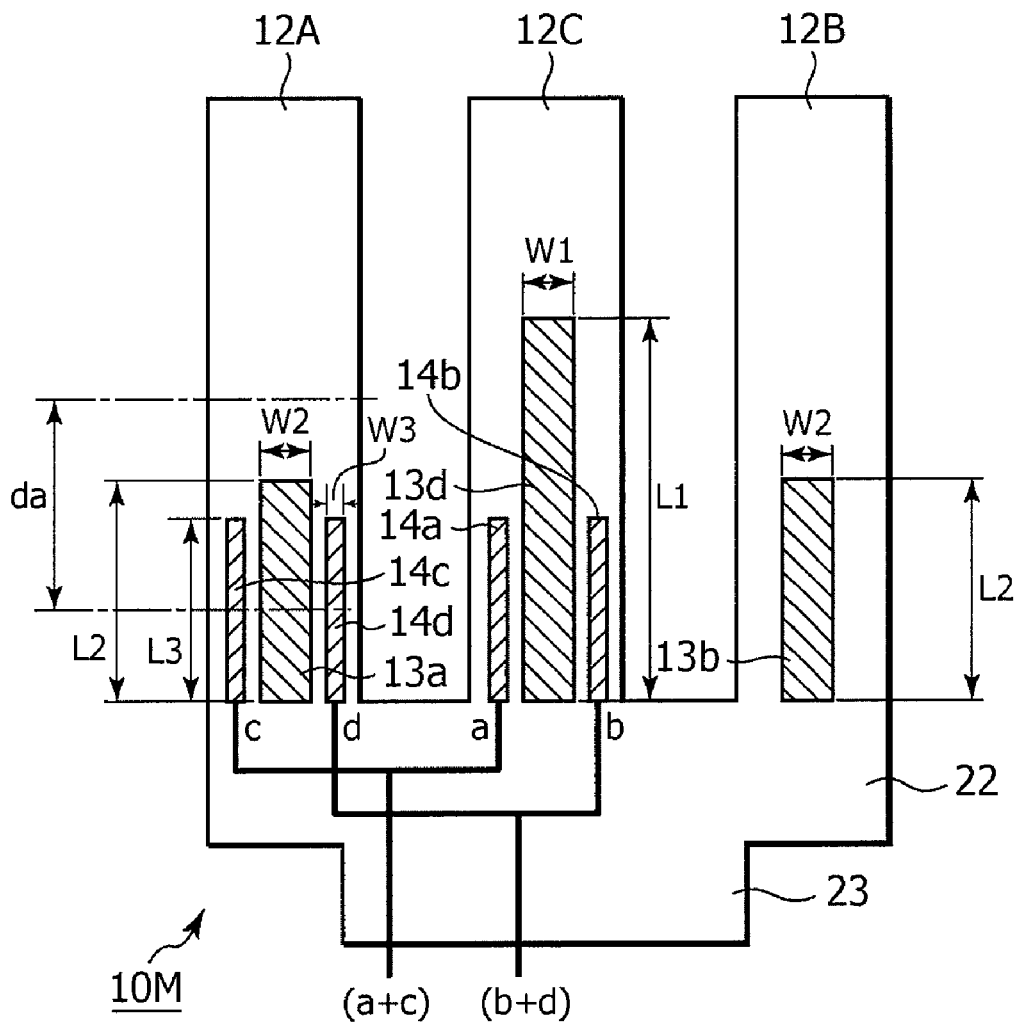
FIG. 30 is a schematic block diagram of an angular velocity sensor according to a twelfth embodiment.

FIG. 30 is a schematic view of an angular velocity sensor according to Twelfth Embodiment. In the figure, like numerals are used for like elements and functions in the angular velocity sensors 10K and 10L described in Tenth and Eleventh Embodiments (FIG. 27 and FIG. 29), and redundant descriptions of thereof are omitted.

The angular velocity sensor 10M according to the present embodiment is different from the angular velocity sensors 10K and 10L according to Tenth and Eleventh Embodiments in that, of two outer arm portions 12A and 12B, one arm portion (for example, the outer arm portion 12A) is provided with two detection electrodes 14c and 14d, while the other arm portion (for example, the outer arm portion 12B) is provided with no detection electrode. Even with such a construction, generation of noise due to accelerations may be avoided in a similar way as in Third, Eighth, Tenth and Eleventh Embodiments.

In First to Ninth Embodiments, there are used examples in which the drive electrode 13 is provided only in the outer arm portions 12A and 12B. In Tenth to Twelfth Embodiments, there are used examples in which the drive electrode 13 is provided in all of the center arm portion 12C and the outer arm portions 12A and 12B. Alternatively, the drive electrode 13 may be provided only in the center arm portion 12C in any of the embodiments. In this case, the outer arm portions 12A and 12B vibrate in a phase opposite to that of the center arm portion 12C by the counteraction of vibration of the center arm portion 12C.

Thirteenth Embodiment

Figure 31:
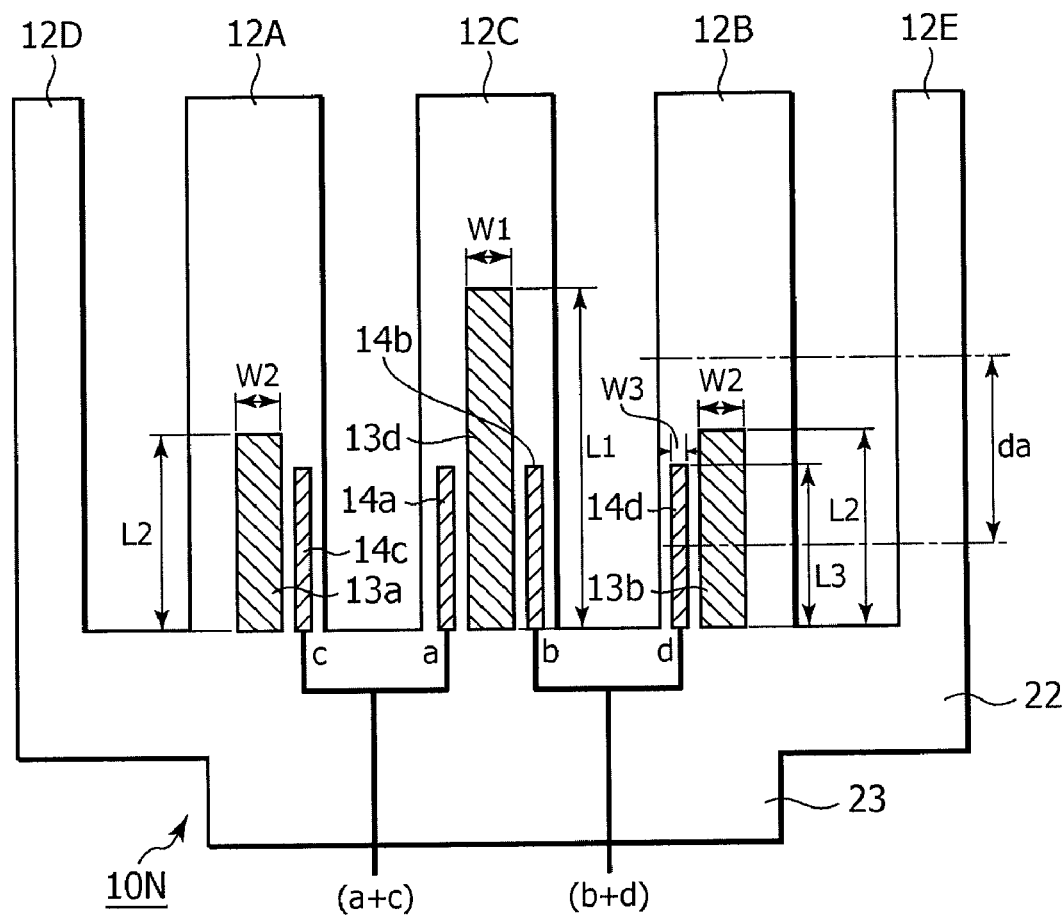
FIG. 31 is a schematic block diagram of an angular velocity sensor according to a thirteenth embodiment.

FIG. 31 is a schematic view of an angular velocity sensor according to Thirteenth Embodiment. In the figure, like numerals are used for like elements and functions in the angular velocity sensors 10K and 10L described in Tenth and Eleventh Embodiments (FIG. 27 and FIG. 29), and redundant descriptions of thereof are omitted.

The angular velocity sensor 10N according to the present embodiment is different from the angular velocity sensors 10K, 10L and 10M according to Tenth to Twelfth Embodiments (FIGS. 27, 29 and 30) in that five arms (arm portions 12A to 12E) are used in the present embodiment instead of the three arm portions. In other words, there are provided additional arm portions 12D and 12E outer sides of the outer arm portions 12A and 12B described in Tenth to Twelfth Embodiments. The number of arm portions is not limited to 5. Even with such a construction, generation of noise due to accelerations may be avoided in a similar way as in Third, Eighth, Tenth to Twelfth Embodiments.

The angular velocity sensors 10K to 10N described in Tenth to Thirteenth Embodiments may also be included in various electronic devices such as the digital camera 260 shown in FIGS. 24 and 25.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An angular velocity sensor, comprising:
    a base portion;
    three arm portions that extend as one piece from the base portion to an approximately same direction;
    a piezoelectric film formed on one surface of each of the arm portions;
    drive electrodes for excitation formed on the piezoelectric films of at least a first arm portion and a second arm portion, said first and second arm portions being positioned on outer sides, among the three arm portions; and
    detection electrodes for angular velocity detection formed on the piezoelectric film of at least a centrally-positioned arm portion, among the three arm portions, wherein:
    among the three arm portions, the two arm portions that are positioned on outer sides are excited in phase with respect to each other, and the centrally-positioned arm portion is excited in opposite phase with respect to the two arm portions that are positioned on outer sides,
    the drive electrodes excite the arm portions in a first direction vertical to surfaces on which the piezoelectric films are formed, and
    the detection electrodes detect a vibration in a second direction parallel to the surfaces on which the piezoelectric films of the arm portions are formed.

2. The angular velocity sensor according to claim 1, wherein among the three arm portions, the centrally-positioned arm portion is provided with a vibration plummet.

3. The angular velocity sensor according to claim 1, wherein a formation width of the centrally-positioned arm portion, among the three arm portions, is formed to be larger than that of the two arm portions that are positioned on outer sides.

4. The angular velocity sensor according to claim 1, wherein the three arm portions have a same resonant frequency in the first direction, and among resonant frequencies of the three arm portions in the second direction, only the resonant frequency of the centrally-positioned arm portion is set near the resonant frequency in the first direction.

5. The angular velocity sensor according to claim 1, wherein on the piezoelectric film of the centrally-positioned arm portion, among the three arm portions, a reference electrode that detects a vibration characteristic of the arm portion is formed.

6. The angular velocity sensor according to claim 1, wherein the detection electrodes are formed in pair on the piezoelectric film of the centrally-positioned arm portion, among the three arm portions, symmetrically about an axis of the centrally-positioned arm portion, a first one of the detection electrodes is formed on a first side of the centrally-positioned arm portion and is formed continuously from the centrally-positioned arm portion via the base portion to an outer arm portion on the first side, and a second detection electrode is formed on a second side opposed symmetrically about the axis of the centrally-positioned arm portion and is formed continuously from the centrally- positioned arm portion via the base portion to an outer arm portion on the second side.

7. The angular velocity sensor according to claim 1, wherein the base portion is formed with a plurality of external connecting terminals for inputting and outputting a signal to each of the arm portions, and each of the external connecting terminals is formed on one surface of the base portion at a position of minimum vibration between the three arm portions.

8. The angular velocity sensor according to claim 7, wherein each of the external connecting terminals is formed in a position deviated from an extended line of an axis of each of the arm portions.

9. The angular velocity sensor according to claim 7, wherein the base portion is provided with a cushioning portion having a width smaller than a formation width of the base portion between a root region of each of the arm portions and a formation area of the external connecting terminals.

10. The angular velocity sensor according to claim 1, wherein:
the centrally-positioned arm portion is excited in opposite phase with the first and the second arm portions by counteraction of excitation of the first and second arm portions.

11. The angular velocity sensor according to claim 9, wherein a following relationship is satisfied:

$$0.25 \leq (f0/fv) \leq 1/\sqrt{2}$$

where
fv is a resonant frequency of a first vibration system in the first direction of the first and second arm portions, the first vibration system including the first, second, and third arm portions, and the support portion, and
f0 is a resonant frequency of a second vibration system in the first direction, the second vibration system including the first, second, and third arm portions, the support portion, and a connection portion.

12. The angular velocity sensor according to claim 1, wherein:
the centrally-positioned arm portion is excited by piezoelectric drive by a third drive electrode in opposite phase with the first and the second arm portions, the third drive electrode being formed on a center portion of the centrally-positioned arm portion.

13. The angular velocity sensor according to claim 6, wherein:
the centrally-positioned arm portion includes, as the detection electrodes,
a first detection electrode, and
a second detection electrode disposed symmetrically to the first detection electrode about an axis of the first direction of the third arm portion;
the first arm portion includes a third detection electrode that detects Coriolis force acted on the first arm portion;
the second arm portion includes a fourth detection electrode that detects Coriolis force acted on the second arm portion; and the angular velocity sensor further includes
a controller that calculates a first sum signal of an output signal from the first detection electrode and an output signal from the third detection electrode, and a second sum signal of an output signal from the second detection electrode and an output signal from the fourth detection electrode, respectively, and that detects a differential signal of the first sum signal and the second sum signal as a angular velocity signal.

14. The angular velocity sensor according to claim 6, which includes:
a controller that calculates a sum signal ((a+c)+(b+d)) and feeds back the sum signal to a self-oscillating circuit as a reference signal,
where
a is a detection value of the first one of the detection electrodes,
b is a detection value of the second one of the detection electrodes,
c is a detection value of a third detection electrode formed on the first arm portion, said first arm portion being positioned adjacent to the first side of the centrally-positioned arm portion, and
d is a detection value of a fourth detection electrode formed on the second arm portion, said second arm portion being positioned adjacent to the second side of the centrally-positioned arm portion.

15. The angular velocity sensor according to claim 6, which includes:
a third detection electrode formed on the first arm portion, the first arm portion being positioned adjacent to the first side of the centrally-positioned arm portion; and
a fourth detection electrode formed on the second arm portion, the second arm portion being positioned adjacent to the second side of the centrally-positioned arm portion,
wherein each of the first, second, third, and fourth detection electrodes have a length in a third direction perpendicular to both the first direction and the second direction, and said lengths are approximately equal to each other.

16. An electronic device, comprising:
a main body; and
an angular velocity sensor,
wherein the angular velocity sensor includes:
a first arm portion, including a first drive electrode, that is excited in a first direction by piezoelectric drive;
a second arm portion, including a second drive electrode, arranged to extend in a length direction of the first arm portion, and being excited by piezoelectric drive in the first direction in phase with the first arm portion;
a third arm portion, including detection electrodes that detect Coriolis force acted in a second direction perpendicular to the first direction and the length direction, arranged to extend in the length direction between the first arm portion and the second arm portion, and vibrating in opposite phase with vibrations of the first and second arm portions; and
a base portion that supports the first, second, and third arm portions, and
wherein the angular velocity sensor is disposed within the main body, and
the first direction in perpendicular to a plane extending through a central axis of each of said arm portions.

* * * * *